A. J. KUSTERER.
TRAY MAKING MACHINE.
APPLICATION FILED MAY 29, 1920.
1,389,197.
Patented Aug. 30, 1921.
12 SHEETS—SHEET 1.
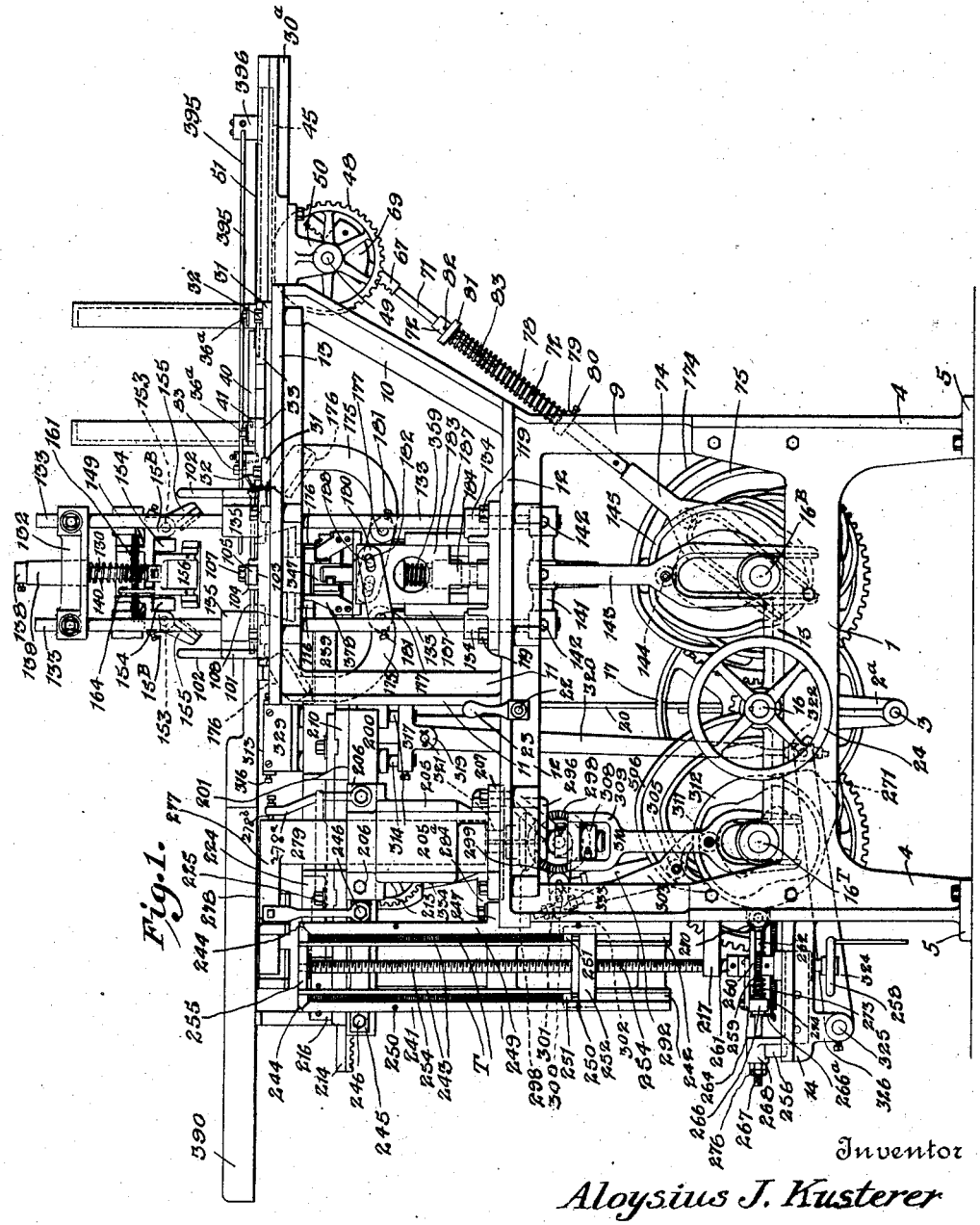
Inventor
Aloysius J. Kusterer
By Mason Fenwick & Lawrence,
Attorneys

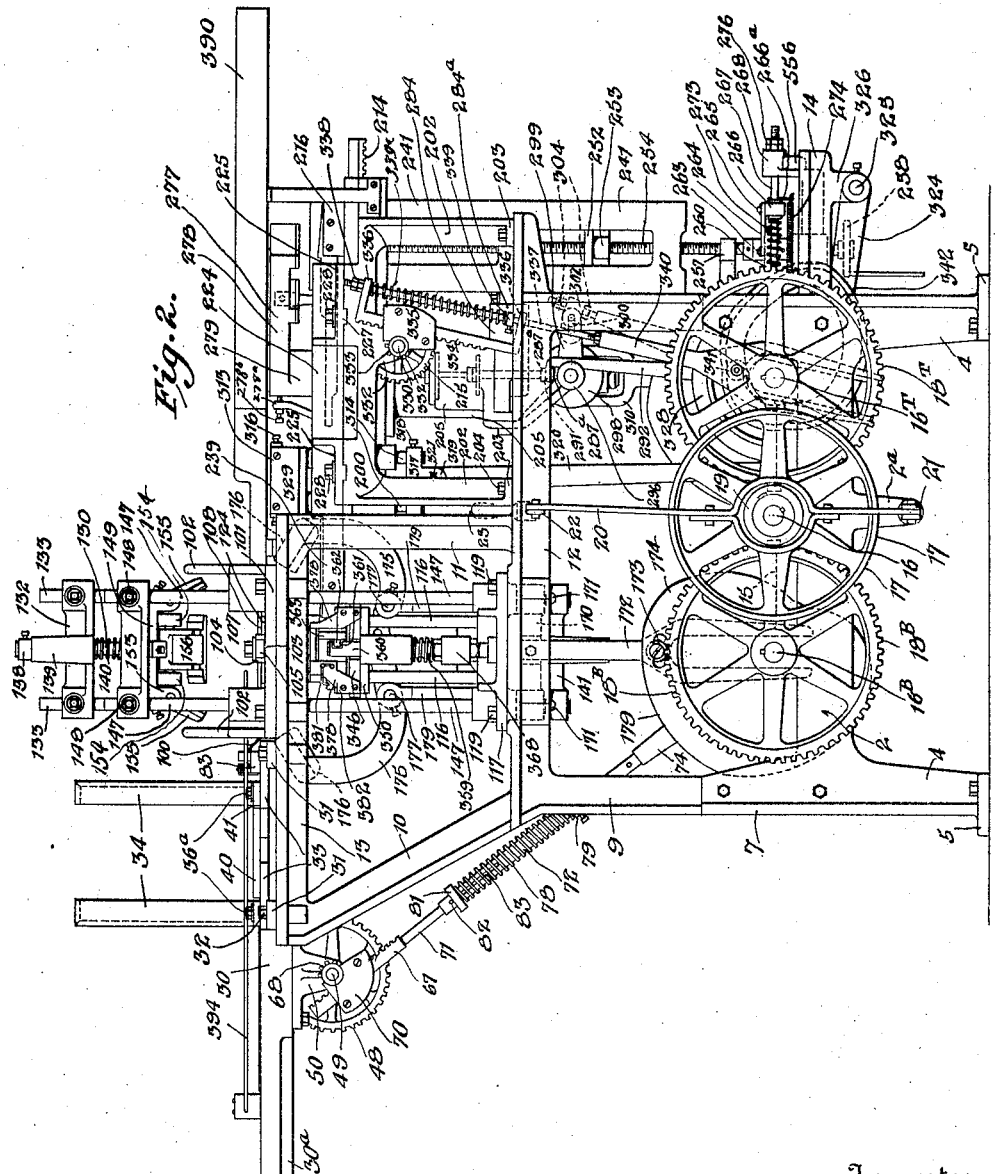

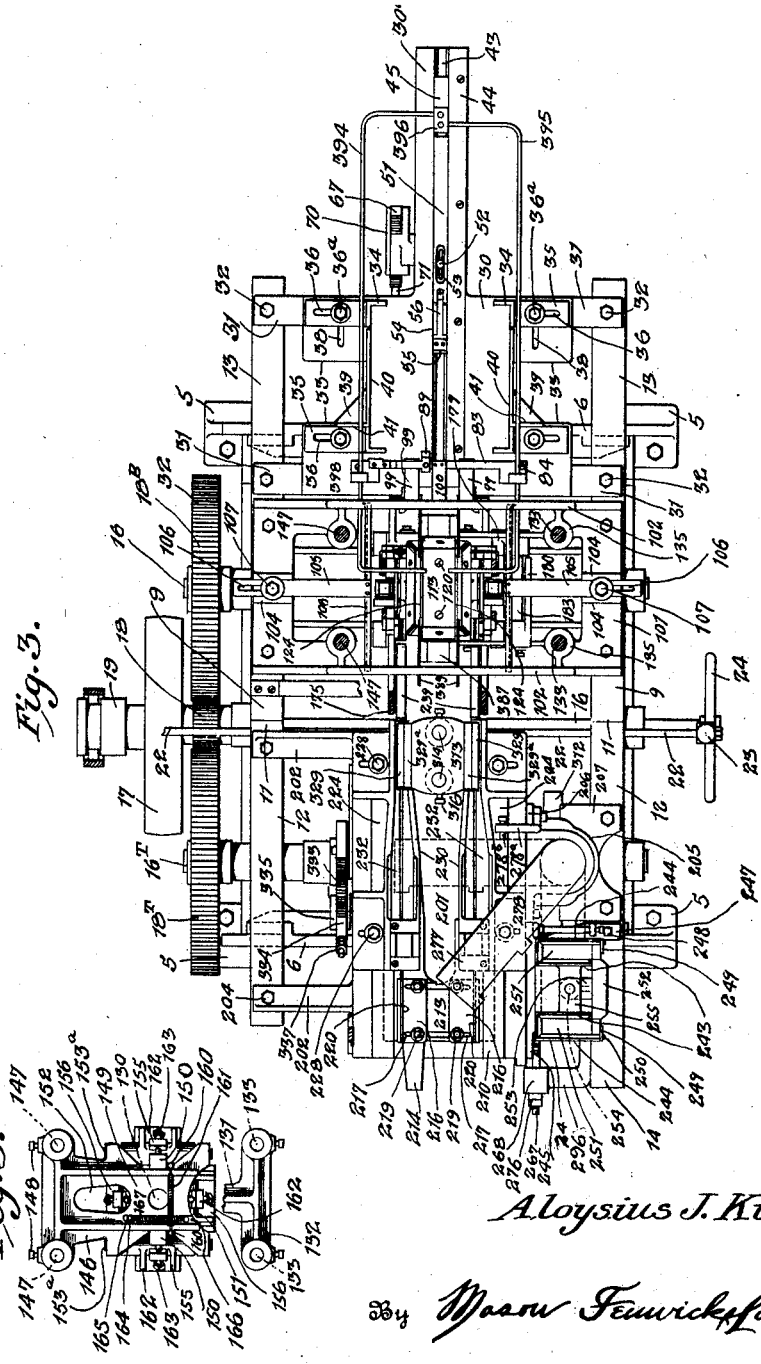

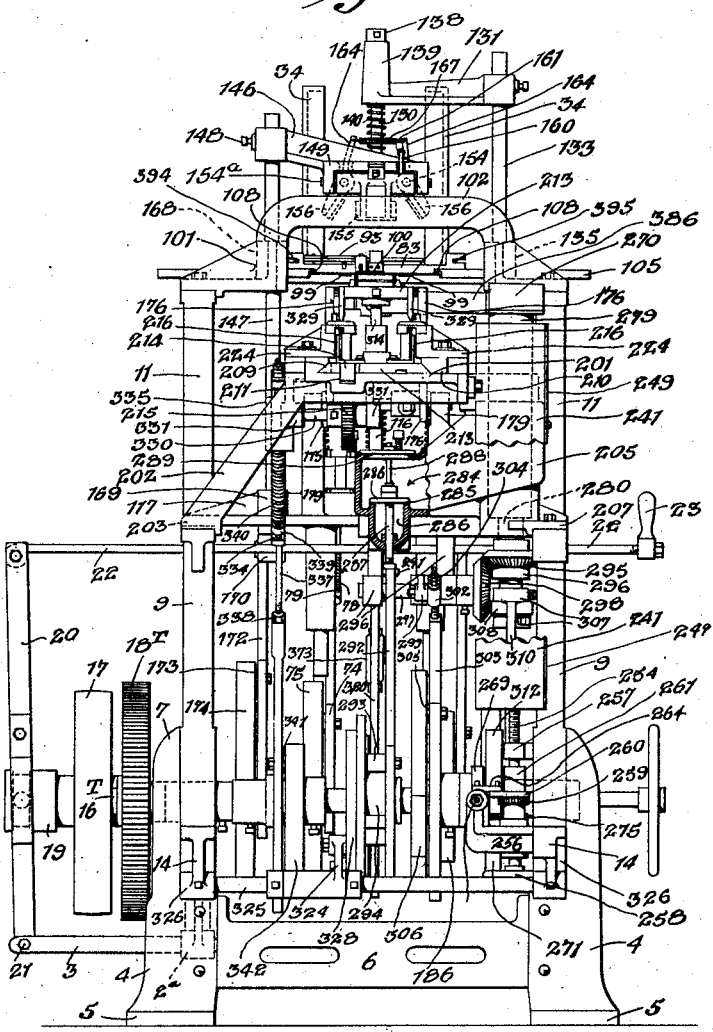

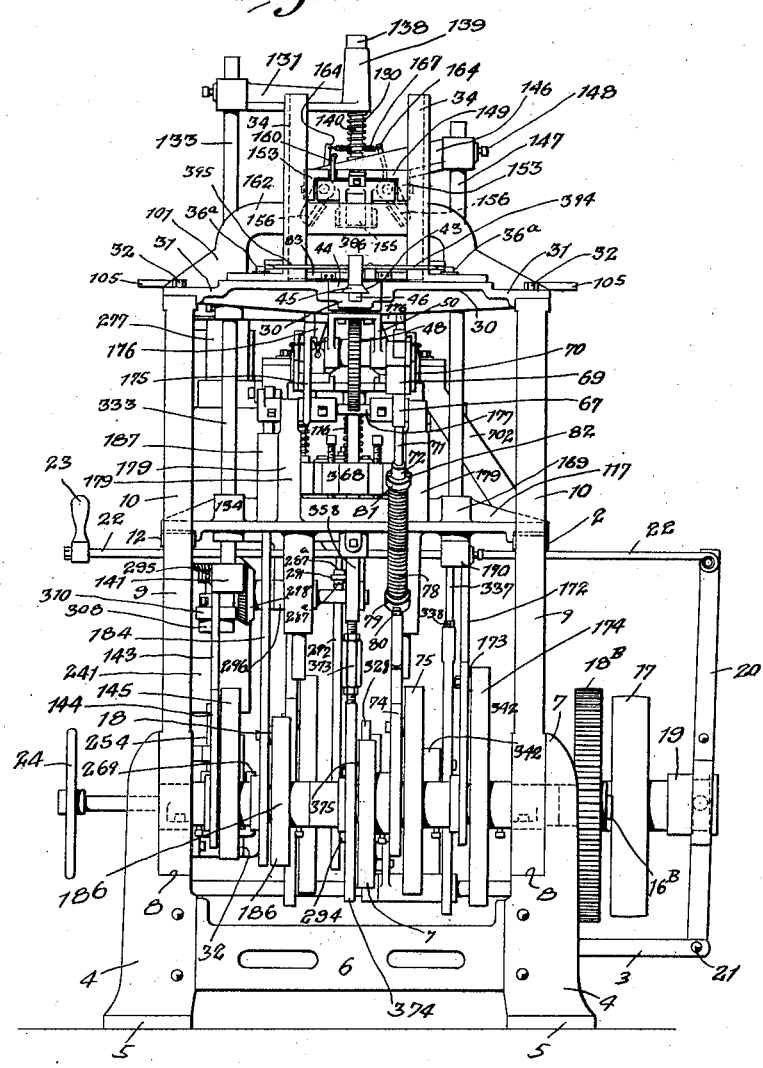

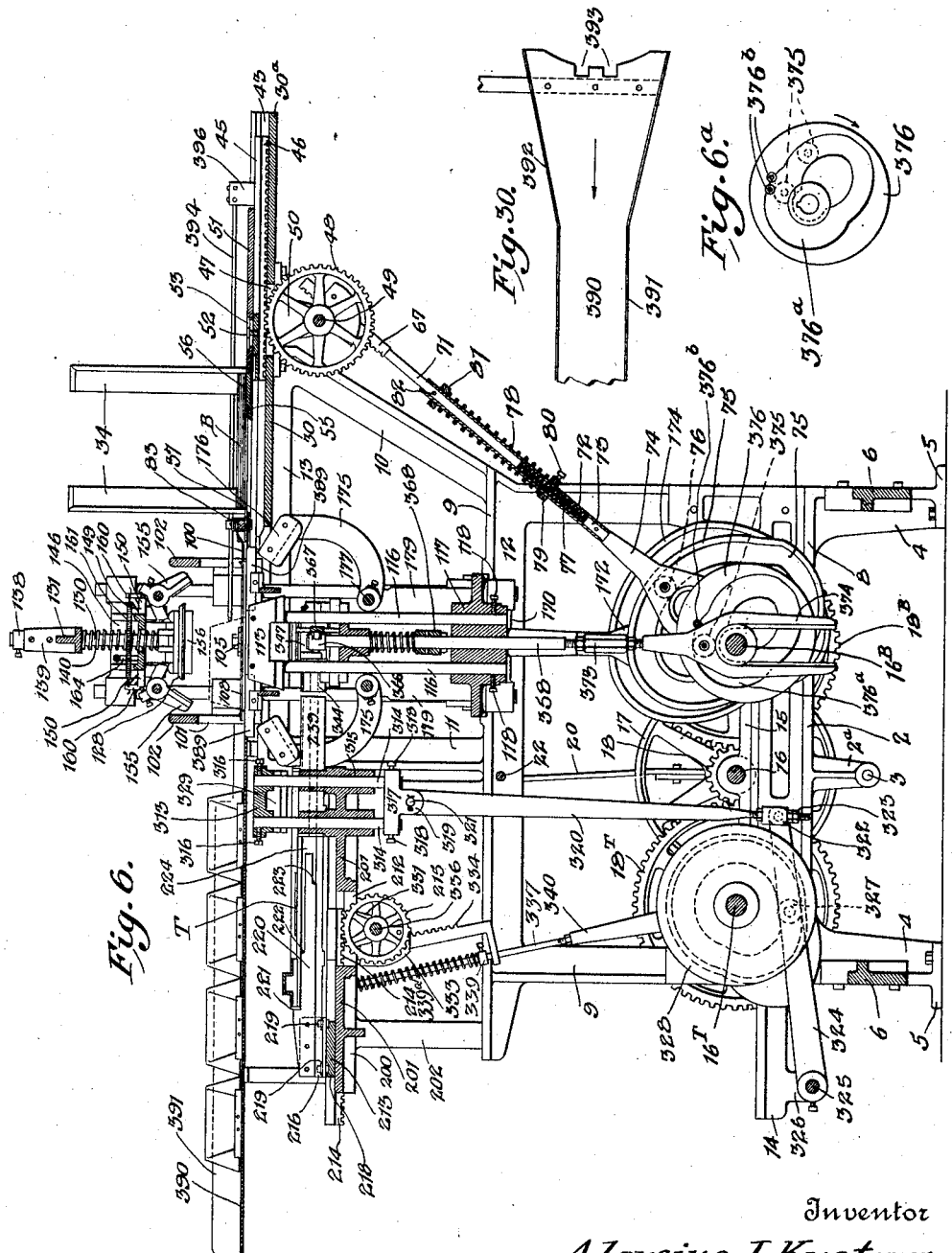

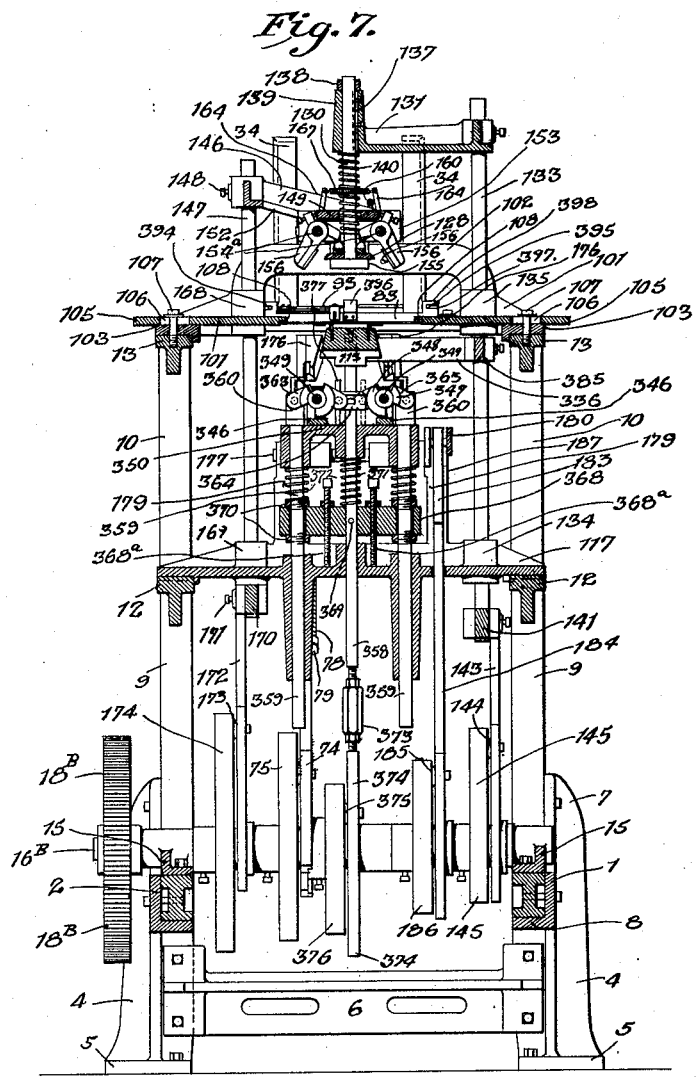

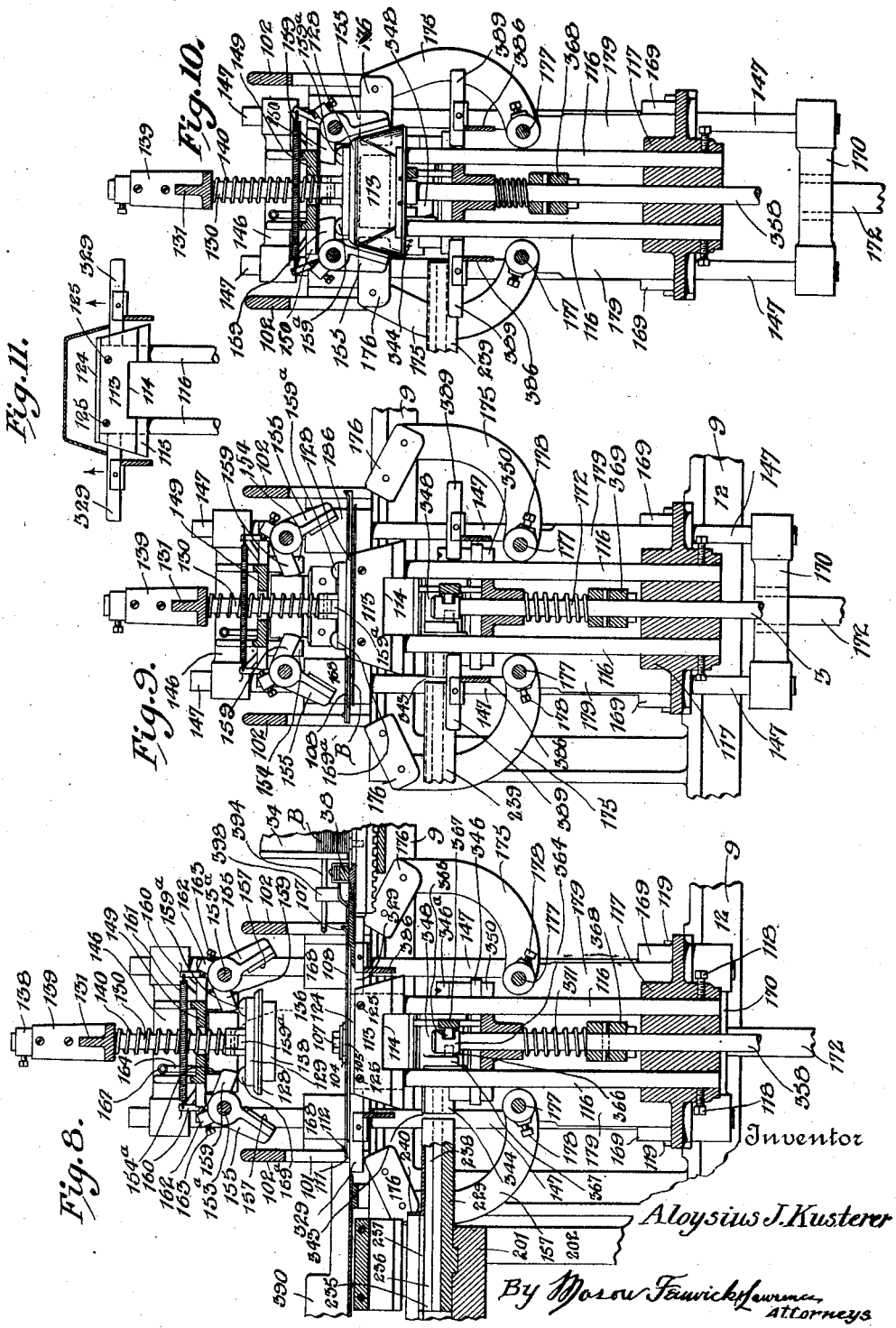

A. J. KUSTERER.
TRAY MAKING MACHINE.
APPLICATION FILED MAY 29, 1920.
1,389,197.
Patented Aug. 30, 1921.
12 SHEETS—SHEET 9.
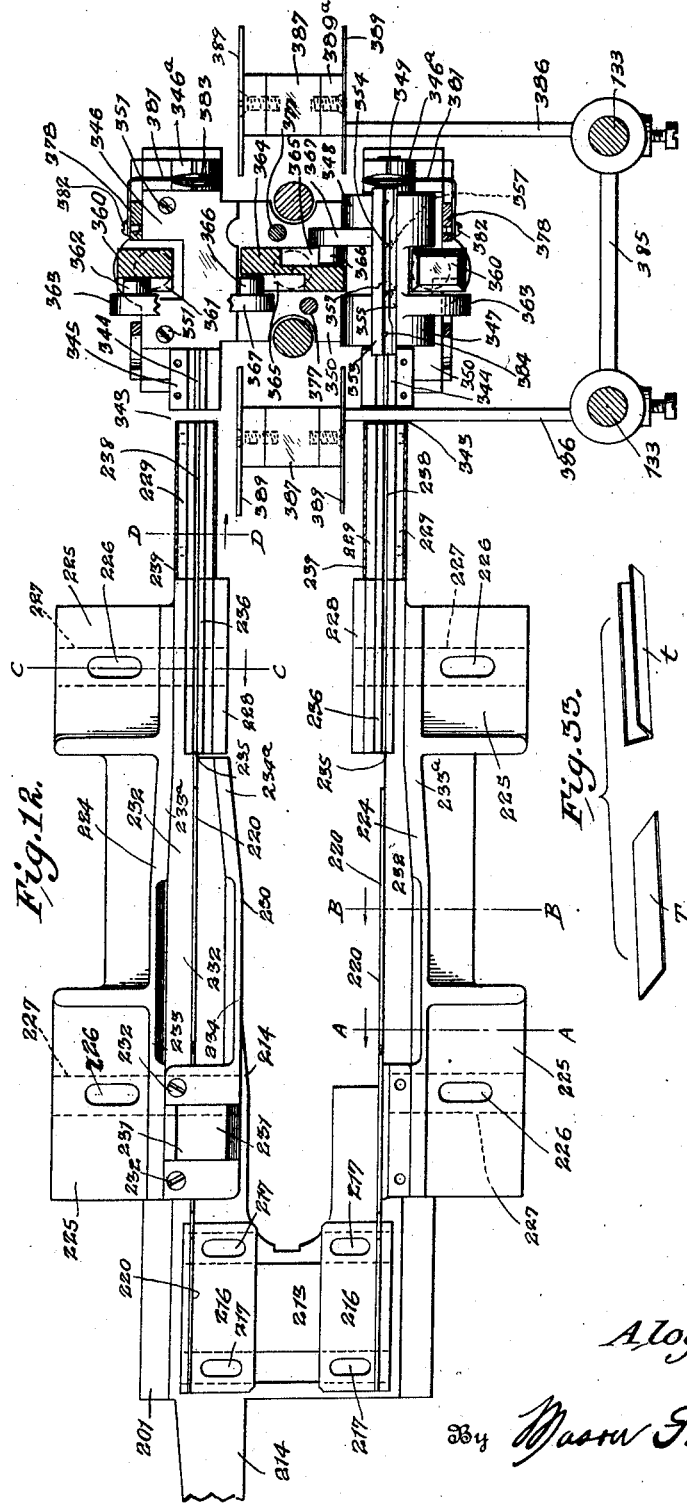
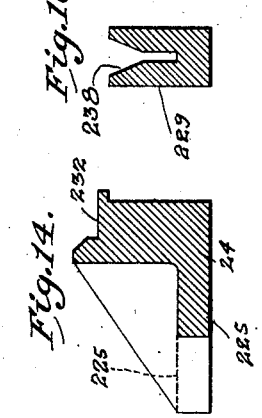
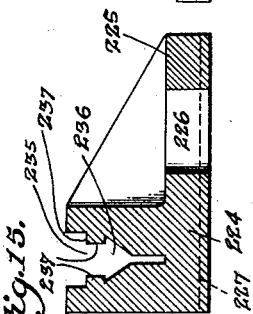
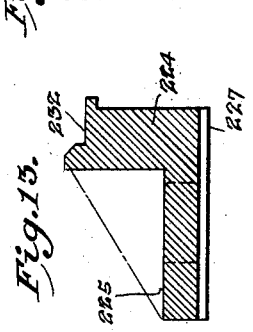
Inventor
Aloysius J. Kusterer
By Mason Fenwick & Lawrence,
Attorneys

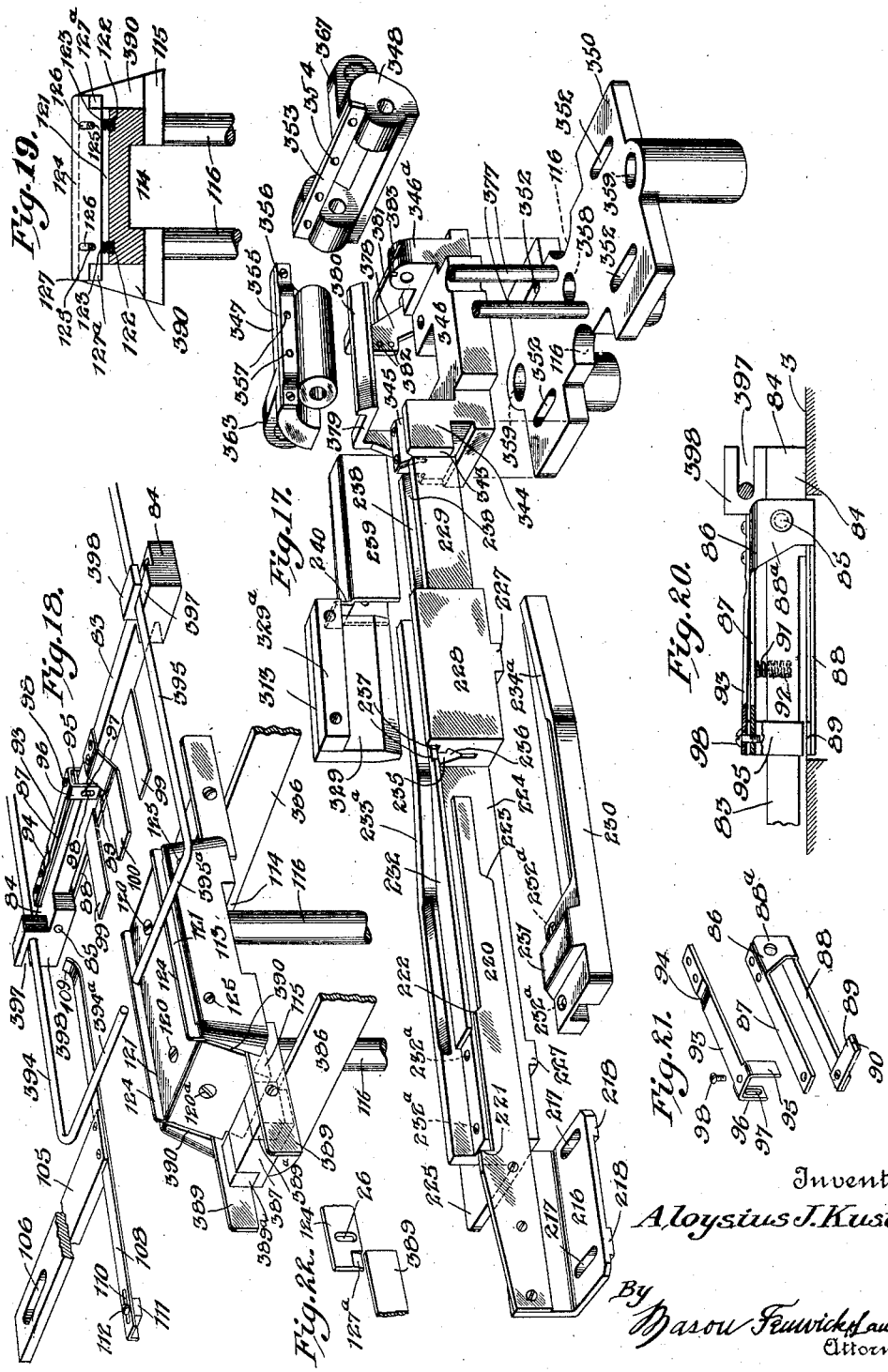

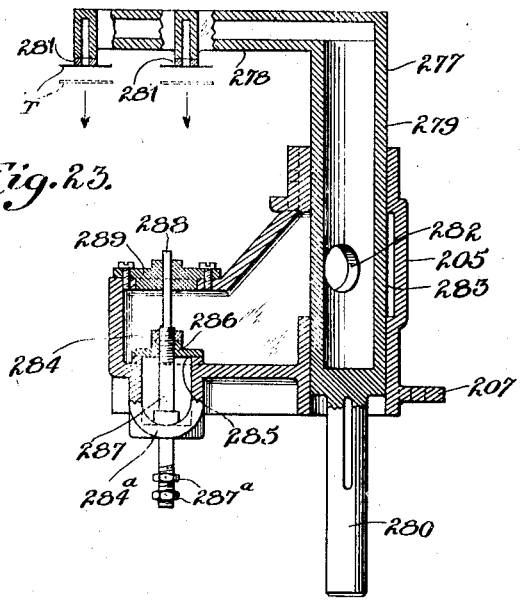
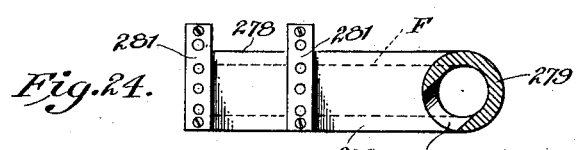
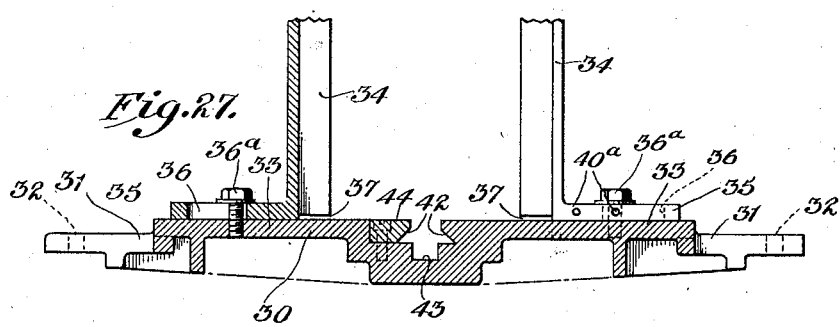

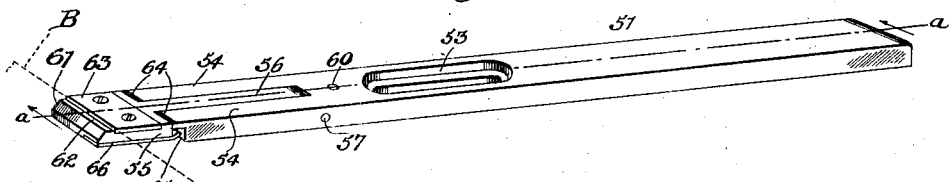
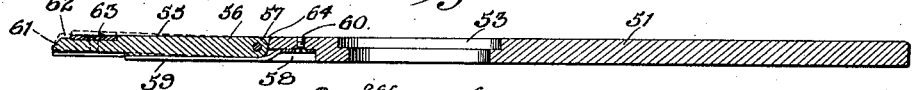
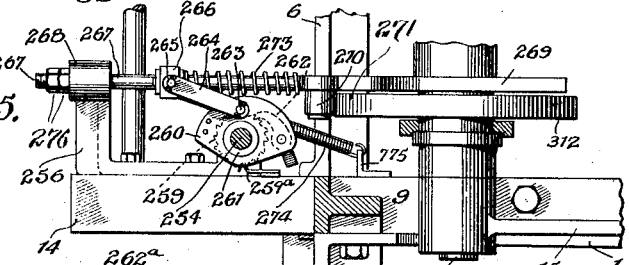
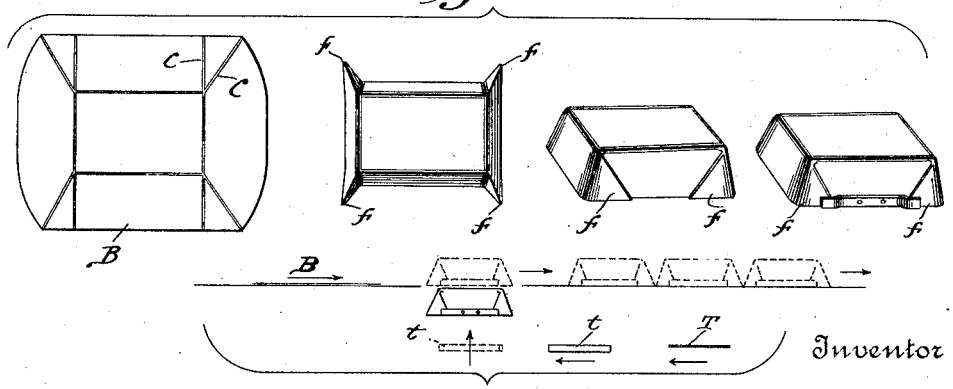

UNITED STATES PATENT OFFICE.

ALOYSIUS J. KUSTERER, OF RICHMOND, VIRGINIA, ASSIGNOR TO CONSOLIDATED PAPER AND BOX MANUFACTURING COMPANY, OF RICHMOND, VIRGINIA, A CORPORATION OF VIRGINIA.

TRAY-MAKING MACHINE.

1,389,197.  Specification of Letters Patent.  Patented Aug. 30, 1921.

Application filed May 29, 1920. Serial No. 385,361.

*To all whom it may concern:*

Be it known that I, ALOYSIUS J. KUSTERER, a citizen of the United States, residing at Richmond, in the county of Henrico and State of Virginia, have invented certain new and useful Improvements in Tray-Making Machines; and I do hereby declare the following to be a full, clear, and exact description of the invention, such as will enable others skilled in the art to which it appertains to make and use the same.

This invention relates to the art of forming containers from flexible sheet material, such as paper board, and affixing sheet-metal edge-binding and fold securing strips to opposite edges of the containers.

The principal object of the invention is to produce metal-bound containers of paper board or the like automatically, by the operation of an automatic machine, without manual labor other than is necessary to tend the machine.

The invention comprises an organized mechanism adapted to feed blanks of paper board or the like, and blanks of sheet metal, to a mechanism that folds the paper board blank over a mandrel or forming block, without cutting material from the corners, secures the folded corner flaps to the sides of the tray, feeds sheet metal blanks, bends them into trough shape, clamps and rivets them to the side edges of the tray, thereby also securing the folded corner flaps, and delivers the finished trays, one by one, in single file, from the machine. It comprises also various combinations and devices for performing subsidiary operations, as will appear more particularly in the detailed description, drawings and appended claims.

In the accompanying drawings Figure 1 is a side elevation of the complete machine viewed from the left hand or operator's side; Fig. 2 is a side elevation viewed from the right hand side where the power is applied; Fig. 3 is a top plan view with the parts over the tray forming devices removed; Fig. 3ª is a fragmentary plan of parts over the tray forming devices, as if viewed from Fig. 3; Fig. 4 is an elevation of the front end of the machine, certain parts having been removed or broken away for clearness of illustration; Fig. 5 is an elevation of the rear or tray blank end of the machine; Fig. 6 is a longitudinal section substantially along the central line of the machine, but showing the tray forming blank or mandrel and presser plate in full lines; Fig. 6ª is an elevation of a cam for actuating means for affixing sheet metal blanks; Fig. 7 is a transverse section through the transverse center of the machine, showing the tray forming devices and presser plate in section; Figs. 8, 9 and 10 are fragmentary views on the longitudinal center line of the machine, but showing the forming block and presser plate in full lines, and the tray forming devices in different positions assumed in successive periods during the folding and edge-binding of a tray; Fig. 11 is a detail illustrating the forming block and the lifting arms in the act of elevating a completed tray from the forming block; Fig. 12 is plan view showing, on an enlarged scale, details of the tray lifters and guides, matrices and sheet metal bending devices, for guiding, shaping and closing the sheet metal binding blanks, and, in horizontal section, parts of the operating mechanism for the sheet metal closing or clamping devices; Figs. 13, 14, 15 and 16 are cross sections, respectively, on the lines A—A, B—B, C—C, and D—D, of Fig. 12, viewed in the directions indicated by the arrows in Fig. 12; Fig. 17 is a perspective of a portion of one of the sheet metal blank guides, feed fingers, bending dies, and affixing means, with parts separated for clearness of illustration; Fig. 18 is a perspective of the forming block, tray lifting arms, paper board blank bridge guide and edge guide, and the ends of the tray ejector diagrammatically shown in correct relative position but detached from the frame of the machine; Fig. 19 is a longitudinal section through the tray forming block exposing one of the spring pressed blades; Fig. 20 is a detail view of the right hand half of the bridge guide for guiding the paper board blanks; Fig. 21 is a separated perspective of parts forming the adjustable throat for guiding paper board blanks one at a time through the bridge guide; Fig. 22 is a detail of the matching ends of a spring pressed blade on the forming block and one of the lifting blades of the tray lifting arms; Fig. 23 is a section through the pneumatic device that carries the sheet metal blanks from the magazine to the guides therefor; Fig.

24 is a bottom plan view of the lifting and conveying arm of said pneumatic device; Fig. 25 is a detail view showing the mechanism for intermittently rotating the feed-screw of the sheet metal blank magazine; Fig. 26 is detail of the ratchet and pawl and detent dog of the means for rotating the feed screw of the sheet metal blank magazine; Fig. 27 is an irregular section across the table that supports the feed mechanism for the paper board blanks showing the front angle columns of the paper board blank magazine; Fig. 28 is a perspective of the paper board blank feed finger, with its tip held down; Fig. 29 is a longitudinal section on the line $a$—$a$ of Fig. 28; Fig. 30 is a plan of the receiving end of the tray discharge chute; Fig. 31 illustrates successive stages in the formation of the metal bound tray; Fig. 32 shows the successive positions of the tray blank, sheet metal blanks and finished trays during manufacture; and Fig. 33 is a perspective of the edge-binding blank.

Similar reference characters designate corresponding parts throughout the several views.

In the succeeding description the front end of the machine will be deemed the end from which the sheet metal blanks are fed the rear end that from which the paper board blanks are fed. The operator's side will be deemed the left side and the power side the right side.

In the embodiment illustrated and particularly described herein, previously cut and scored paper board blanks impregnated with paraffin, of the form illustrated at B, Fig. 31, are stacked in a magazine or hopper at the rear end of the machine, and previously cut rectangular blanks of the form illustrated at T, of tin plate or other sheet material suitable to form an edge binding, are stacked in a magazine or hopper at the front end of the machine. By the operation of the machine the paper board and tin plate blanks are fed in proper timed relation toward a forming mechanism disposed centrally of the machine between the two magazines; the tin plate blanks are bent to V-shape in cross section, as indicated at $t$, while on their way to the forming mechanism; the paper board blanks are there folded into trays and the ears or flaps protruded at the corners by the turning in of the sides are folded flat and secured by the V-shaped tins, which are clamped over the edges and self-riveted thereto. Although the magazine feed shown is (at the present time) preferred, it is to be understood that this type of feed is not essential to the operation of the tray forming and binding mechanism, but that other feeding mechanisms, such as web, or strip feeding devices, might be used without modifying the operation of said forming mechanism, as it is only essential to have the paper board and tin plate in the form of blanks by the time they are in position to be formed and united.

The mechanism is supported and coördinated on a frame work the pedestal structure of which comprises two, parallel, fore and aft castings each consisting of two upright end members connected between their ends by longitudinal members 1 and 2. The right hand pedestal casting is similar to the left hand casting, except that the member 2 of the right hand casting, as shown, has a depending hanger 2ª sustaining an arm 3, the end of which serves as a fulcrum for a clutch shipping lever in the embodiment illustrated. Both right and left pedestal castings have legs 4 terminating in flanged feet or bases 5 which may be perforated to permit the passage of bolts by which the machine may be bolted securely to the floor or other primary foundation. Cross members 6 have their ends bolted to the legs 4, one member 6 at each end of the pair of fore and aft castings in order to brace and strengthen the pedestal. Extending upward at each end of the castings above their longitudinal horizontal members 1, 2, and in line with the legs 4, are members 7. A shelf 8 runs longitudinally of each horizontal member 1 and 2. On the said shelf 8 of each pedestal casting rests a stepped side frame 9, bolted to said shelf 8 and to the upward projecting members 7 of the pedestal castings. Each side frame 9 comprises an open frame work, the lower portion of which is rectangular and the upper portion trapezoidal in general outline. The trapezoidal portion is of lesser longitudinal extent than the rectangular portion. Its rear upright 10 inclines upward from the rear of the rectangular portion and its front upright 11 is perpendicular to the upper side 12 of the rectangular portion and meets the said upper side of the said rectangular portion about midway of its length. The side members 12 forward of the perpendicular 11 form the lower steps of the side frames 9 adapted to support certain framing and mechanism that has to do with the feeding and preparation of the tin plate blanks as will later appear. The upper horizontal members of the trapezoidal portions of the side frames 9 are tied together by a table casting which supports the paper board blank feeding mechanism, and a central casting that functions in connection with the tray formig mechaism as will presently appear. Projecting horizontally forward from the lower portion of each rectangular member of the frame 9 is a member 14 which serves as a support for certain operative portions to be described.

On the lower member of the rectangular portion of each side frame 9 that rests on the longitudinal shelves 8 of the pedestal castings is a bearing member 15 having a central bearing for the main power shaft 16, and end bearings for the shaft 16^B which controls the paper board blank feeding and tray forming mechanisms, and for the shaft 16^T which controls the tin plate feeding and shaping mechanisms.

In the machine illustrated the main power shaft 16 carries a pulley 17 sleeved thereon and a gear pinion 18 keyed thereon at that end which extends from the right hand side of the machine. The pulley 17 is adapted to be clutched to the shaft 16 by a clutch 19 operated by the shipping lever 20 fulcrumed at 21 on the arm 3, said lever 20 having an operating rod 22 projecting across the frame to the left hand or operator's side, where it is provided with a handle 23. The pinion 18 meshes with a gear wheel 18^B on the shaft 16^B and a gear wheel 18^T on the shaft 16^T and thereby drives all of the cams that operate the several mechanisms in proper time relation with respect to each other as will hereinafter appear.

On the end of shaft 16 that projects at the left or operator's side of the machine is a hand wheel 24, by which the machine may be turned over by hand when the clutch is open for purposes of testing, examining or clearing the mechanism in case a blank should be distorted and clog the machine.

Proceeding now to the mechanism for retaining and feeding the paper board blanks:

A table casting 30 of irregular outline as shown in Fig. 3 is bridged across the space between the stepped frames 9 and bolted to the upper sides of the members 13 of said frames. The sides of the table 30 have T-shaped recesses formed therein providing four narrow lateral extensions 31 through which, and the members 13, securing bolts 32 are passed; and four wider portions 33 on which are mounted four angle columns 34 which constitute a magazine or hopper for holding a stack of paper board blanks B. Each angle column 34 has, at its base, a flange 35 which is slotted at 36. A bolt 36^a passes through this slot and a slot or hole in the table and enables each column 34 to be adjusted laterally of the machine in order to adapt the magazine to hold blanks of different widths. The transverse vertical webs of the forward magazine columns 34 end a distance above the surface of the table 30 substantially equal to the thickness of a paper board blank as shown at 37. The rearward members 33 of the table 30 are slotted longitudinally of the machine as at 38, so that the rearward pair of columns 34 may be adjusted longitudinally of the machine to adapt the magazine to receive longer or shorter blanks B. Fillets 39 serve to strengthen the casting 30. Bolted to each of the forward columns 34 is a guide member 40, of a height equal to the thickness of the flanged base 35 of the column. The forward end of each guide 40 extends laterally at right angles to its length as shown at 41 and through this laterally extending end 41 each guide 40 is bolted as at 40^a to the base flange 35 of the forward columns 34, respectively. The guides 40 trail back from the forward columns toward the rearward columns 34 and keep the paper board blank from skewing as it is advanced through the spaces 37, guiding all parts of it in right lines after its forward and rearward ends have moved away from the lateral support of the columns during the feeding operation.

The table 30 is provided centrally with a fore and aft groove having an undercut portion 42 and a depressed right angular channel 43 running from the forward edge thereof to the extremity of a rearward extension 30^a of the table 30. On one side this groove 42 is bounded by the inset shim 44. A reciprocating feed bar 45 is arranged to reciprocate in the groove 42, 43. The feed bar 45 comprises a bar that is of dove-tail cross section fitting the undercut portion 42 of said groove, and a rack member 46 on its under side fitting the rectangular channel 43. About midway of its length the table 30 is slotted as at 47, from the bottom of channel 43, to permit a gear wheel 48 to engage the rack 46, as clearly shown in Fig. 6. The gear wheel 48 is secured to a short shaft 49 which is journaled in hangers 50 bolted to the under side of table 30, and is given an oscillatory or alternating rotary movement, by means to be presently described, in order to reciprocate the feed bar 45.

On top of the reciprocating feed bar 45 a feed finger 51 is adjustably secured by means of the bolt 52 passing through a slot 53 in said finger 51, and threaded into the bar 45 so that the position of said finger 51 may be longitudinally shifted with respect to the bar 45. The finger 51 lies between the side walls of the said fore and aft groove in the table 30 above the undercut portion, but may project slightly above the surface of the table, as by a distance approximately equal to the thickness of one of the paper board blanks stacked in the magazine. The forward end of the finger 51 is slotted longitudinally as shown in Figs. 3 and 28, thus providing two parallel ends 54 between which the feed finger tip 55 is pivoted. The finger tip 55 has a forward end of a width equal to the full width of the finger 51. From the wide end of the finger tip a shank 56 extends rearward between the parallel members 54 and is pivoted at 57 near its rear terminal to the finger 51. Back of the end of the shank 56 is a recess 58 formed in the under side of the finger 51. In the recess 58 one end of a spring 59 is riveted or bolted as at 60. The spring 59 extends forward underneath the finger tip giving to the latter an upward bias at its free end. The forward end of the finger tip 55 is chamfered at 61 so that it may slide freely beneath the lowest paper board blank in the magazine 34. Just back of the chamfer 61 is a narrow horizontal surface 62, and back of the surface 62 is a relatively wide recess, rectangular in section, in which is secured a hardened steel or other wear plate 63. The front end of this wear plate 63 is elevated above the surface 62 a distance not greater than the thickness of a paper board blank, so that as the finger advances the chamfered end of the tip 55 will slide under the lowermost blank in the magazine, but the front edge of the wear plate will engage the edge of said blank and advance it from beneath the stack as the feed bar and finger advance. In order that the blank next above the blank being pushed from beneath the stack may not be caught by the ends of the members 54 on the finger 51, these ends are chamfered also as at 64. To prevent the spring 59 from elevating the tip 55 too high, a stop is provided by a rabbet 65 in the under side of the end of the left hand member 54, with the overhanging shoulder of which the projecting end of a stop strip 66, riveted to the under side of the wide portion of the finger tip 55 engages. By this construction the finger tip 55 will properly engage the rear edge of the lowermost blank in the magazine even if said blank be warped, and will not engage more than one blank during the advance of the feed bar and finger. And the feed finger may be positioned on the fed bar in accordance with the length of the blanks which the columns 34 of the magazine are adjusted to receive. It will also be obvious that wear plates 63 of different thickness may be provided if found desirable in case paper board blanks of different thicknesses should render a change of wear plate advantageous.

In order to reciprocate the feed bar 45 and attached feed finger, the gear wheel 48, before described as arranged to engage the rack 46, is alternately rotated in opposite directions by a rack bar 67 engaging a pinion 68 that is secured to shaft 49 on the end that projects through the hanger 50 toward the right hand side of the machine as shown in Fig. 2. On the right hand hanger 50 is formed a slide bearing 69 having an oblique groove to accommodate the slidable rack bar 67, which is held in the groove by a removable cap plate 70. The rack bar 67 is rigidly united to a rod 71 that telescopes in a tubular rod 72, the lower end of which is sleeved over the reduced extremity 73 of a forked member 74, and pinned thereto as shown in Fig. 6. The forked member 74 passes astride a flanged hub on the cam 75 secured to shaft 16ᴮ, as shown in Figs. 5 and 6, and carries a roller stud 76 that engages a cam groove in the left hand face of said cam 75. Within the tubular rod 72 between the ends of the forked member 74 and rod 71 is a coiled compression spring 77 adapted to elastically resist the upward thrust of the forked member 74, which is the thrust that rotates the gear 48 in the direction to feed a paper board blank. As an additional resilient connection between the rod 71 and the cam actuated fork 74, a coiled spring 78 surrounds the tubular rod 72, bearing at its lower end on a collar 79 adjustably secured to said tubular rod by a set screw 80, and bearing at its upper end against a collar 81 that bears against a pin 82 passing through the rod and through a slot 83 in the tubular rod 72, as shown in Fig. 1. The purpose of the springs 77 and 78 is to interpose a safety appliance between the positively acting cam 75 and the feed finger 51 so that in case a considerable obstruction is interposed to the advance of the feed finger, as in case a blank should jam, the springs will yield and allow the forked member 74 to make a complete reciprocation without moving the rack 67. Hence, if the machine should accidentally be clogged, no injury to the mechanism can occur. The tension of the spring 78 may be varied by adjusting collar 79. Although two springs are shown and preferred, it will be obvious that one spring disposed in either arrangement will carry out the principle of the machine in the respect noted. One complete rotation of the shaft 16ᴮ and cam 75 accomplishes one complete reciprocation, or advance and return of the feed finger 51. The cam groove in the cam 75 is designed to effect the necessary or desirable dwells in the movement of the feed finger.

Immediately in advance of the forward hopper or magazine columns 34 is a bridge piece 83, having downward offset ends 84 through which the bridge piece is bolted to the table 30, whereby to provide a space between the bridge piece and the table 30 through which a paper board blank B may pass. Pivoted to the right hand end of bridge piece 83 by a pivot screw 85 is a two armed member 86, one arm 87 of which overlies the top of the bridge piece 83, and the other arm 88 underlies the bottom surface of it. The two arms 87 and 88 are connected at their right hand ends by a connecting web 88ᵃ through which said pivot screw passes and is threaded into bridge piece 83. The free end of lower arm 88 has riveted to its upper side a horizontal lip 89 extending rearward toward the hopper or magazine, and having a chamfer 90 on the upper side of its extremity. The arm 88 and lip 89 lie in a depression of proper depth and outline in the table 30 so that the upper sides of said arm and lip will present no obstruction to the advance of the paper board blanks B; and the lip is chamfered to allow the blanks to slide freely over it. The lip extends rearward under the stack of blanks when the magazine is filled. A coiled spring 91 seated in a cavity 92 in the upper side of bridge piece 83 exerts its tension to press the arm 87 upward and as this arm is connected to the arm 88 by the web 88ª, to also press upward the arm 88 and the lip 89 carried thereby. Overlying the upper arm 87 and riveted to its right hand end is a flat bar 93 of spring metal, rendered flexible by an arcuate cross cut 94 and given an upward set or bias. The free end of flat elastic bar 93 carries a depending plate 95 extending downward over the rear side, or the side next to the magazine, of the bridge piece 83, and also a depending plate 96 extending downward over the front side, or the side away from the magazine, of said bridge piece. The plate 95 is longer than the plate 96 which has a slot 97 through which passes a pin 98 secured in the bridge piece 83 to limit the vertical play of the arms 87, 88 and bar 93. A headed screw 98 passes freely through a hole in the end of the spring bar 93 and engages a threaded orifice in the arm 87. By the screw 98 the end of the plate 95 may be adjusted toward and from the lip 89 carried by the arm 88. The space between the end of plate 95 and the upper surface of the lip 89 should be just wide enough to admit a paper board blank and the width of this space may be nicely varied to a minute degree by means of the screw 98. Thus the said space constitutes a throat for the entrance of an advancing blank and will automatically adjust itself to a blank though the latter be warped, and prevent the advance of two blanks at once, should one adhere to another. As the throat once set remains of the same size and may vary its position within limits sufficient to accommodate itself to any blank, flat or warped, that is likely to be presented, all blanks pass from the magazine readily through an even sized throat adjusted with accuracy to the particular thickness of blanks stacked in the magazine.

To keep the blanks pressed flat on the table after they have passed through the throat and beneath the bridge 83 two lateral elastic presser plates 99 and one median plate 100 extend forward from the bridge piece toward the former with their lower faces very slightly above the top of the table 30. These presser plates hold the blanks down and insure their continued engagement with the feed finger tip 55 when no longer held down by the stack of blanks, the bridge 83, and described attachments.

Bridged across the upper members 13 of the side frames 9 directly forward of the table 30 is an open frame casting 101, having its ends bolted down upon the upper surfaces of the members 13 and connected by transverse arched members 102. Midway of the upper surface of each end portion of the frame 101 is a transverse seat 103 formed by two transverse ribs 104. Seated in each seat 103 is the shank of a T-shaped member 105 which is slotted at 106 and secured adjustably to the frame 101 by a bolt 107 passing through the slot into said frame. The cross arm 108 of each T-shaped member consists of an angle bar having a horizontal and a vertical flange, the reëntrant angle being presented toward the longitudinal center line of the machine, and the rearward extremities of the two flanges of the angle bar flared as at 109. The opposite or forward end of each cross arm 108 has a slot 110 through the horizontal flange and a stop block 111 is seated in the angle and adjustably held by a headed screw 112, to said horizontal flange. The said angle bars or cross arms 108 constitute guides for the paper board blanks during their further advance from the magazine. The horizontal flanges have their under faces in a plane that lies parallel with the upper surface of table 30, and about the thickness of a paper board blank above it, thus overlying the advancing blanks and holding them flat while the vertical flanges guide the lateral edges of the blanks so that they must move in parallel lines. The flare of the rearward ends 109 of the flanges forms an unobstructed guiding entrance for the blanks and the adjustable stop blocks 111 halt their advance at a limit that registers their central portions over the center of the forming block to be presently described. The guides are adjustable to suit blanks of different widths, and the stop blocks are adjustable to adapt the machine for blanks of different lengths.

The paper board blanks are formed and folded over a forming block or mandrel 113 by clamping and folding mechanism, and while still held on the forming block or mandrel the tin plate edge binding strips are applied,—all by mechanism to be described later. The forming block 113 is illustrated in plan in Fig. 3, in side elevation in Figs. 6, 8, 9, 10 and 11 and in transverse section in Fig. 7. These views also illustrate said forming block in its relationship to the frame and shaping mechanisms. It is shown on a larger scale in Figs. 18 and 19. In its general configuration the forming block is a frustum of a pyramid of rectangular base having a flat top and, in the form shown, of greater dimension longitudinally of the machine than transversely thereof, the size and outline of said top determining the size and outline of the bottom of the trays to be formed over it. The said forming block has a transverse rectangular groove or recess 114 across its under side and longitudinal rabbets 115 at the lower edges of its fore and aft sides. The cross groove 114 and rabbets 115 provide room for the operation of the tin clamping jaws as will hereinafter appear. The forming block 113 is rigidly secured on the upper ends of two posts or thrust columns 116 which are secured, in the longitudinal mid-line of the machine, in holes bored in the rigid casting 117 by set bolts 118. The casting 117 bridges the frames 9, its ends being secured to the upper surfaces of the intermediate members 12 between the uprights 10 and 11 by bolts 119. The casting 117 thus aids in tying the side frames firmly together, and supports the forming block. It is provided also with various guide bearings for reciprocating operating rods as will presently appear. The forming block is rigidly seated on the upper ends of the posts 116 which enter sockets in the center longitudinal line of the said block, the block being secured to said posts by machine screws 120 passed through the block from its upper surface and threaded into the ends of the posts, and by set screws 120$^a$. Thus the forming block may be removed and another of different size or shape may be applied if desired.

The upper face of the forming block 113 is adjusted in a plane a little lower than the plane of the upper surface of the table 30. Parallel grooves 121 are sunk in the upper surface adjacent the longitudinal edges, to a depth equal to approximately two fifths the thickness of the block. Near each end sockets 122 are sunk in the bottoms of the grooves and coiled springs 123 are seated in these sockets. Resting on the springs 123 and guided in the grooves 121 are blades or plates 124 which are biased upward by the springs so that their upper edges extend say about one quarter inch above the plane of the top of the former block and rest substantially in the plane of the under surface of the horizontal flanges of the guides 108. The upward movement of the blades 124 is limited and they are prevented from endwise displacement by pins or screws 125 which are inserted in the forming block 113 and pass through slots 126 in the blades and across the grooves 121. The upper end corners of the blades 121 are rounded or chamfered as at 127, and each blade is beveled on the outside of its lower corners as at 127$^a$. A blank B fed by the feed finger engages the blades 124, and slides over them, resting on said blades when its advancing end comes into engagement with the stops 111 on the guides 108. At each forward movement of the feed finger in the normal operation of the machine a paper board blank B will be disengaged from the bottom of the stack in the magazine, pushed under the bridge 83 and over the yielding blades 124 on the forming block 113, guided and held true by the guides 108. When the blank contacts with the stops 111 it will be registered properly over the forming block 113, resting on the blades 124.

When the paper board blank has reached the described position and is symmetrically disposed over the forming block 113, a clamping plate 128 descends and presses the blank into close contact with the top surface of the former, the blades 124 yielding downward until their top edges are flush with the top surface of the former and the central portion of the paper board blank is then clamped securely to the former. The form and size of the plate 128 is precisely the same as the form and size of the top surface of the former and the bottom of the tray to be formed from the blank will be of the same area and outline. The clamping plate 128 is detachably secured to a backing member 129 which has four semi-cylindrical bosses symmetrically arranged on the longitudinal and transverse center lines thereof for a purpose to be explained. The backing member 129 has a central boss and a hole is bored through the boss to fit over the end of a rod 130 that depends from an arm 131 forming part of a T-shaped bracket the lateral arms 132 of which are bored and fitted on rods 133 adapted to reciprocate up and down through bearings 134 in the bridging casting 117 and bearings 135 in the bridging casting 101. The backing member 129 is pinned to the rod 130 as shown at 136. Interchangeable plates 128 of different sizes, each adapted to be attached to member 129, are provided for different sizes of trays. The upper end of rod 130 is adapted to slide freely through a bore in the arm 131, but is provided with a keyway which engages with a key or spline carried in the bore, as illustrated at 137 in Fig. 7, in order to insure that the clamping plate cannot turn but must register exactly with the top of the forming block 113. A collar 138 secured to the upper end of the rod 130 limits the downward movement of the latter with respect to arm 131. The bore in arm 131 to accommodate the rod 130 is formed through a long bearing projection 139, to resist any tendency of the clamping plate to move laterally. A coiled spring 140 surrounds the rod 130, its upper end bearing against the lower side of the arm 131 and its lower end bearing upon the top of the presser plate backing 129. Thus when the arm 131 descends the clamping plate will descend until it has pressed the paper board blank against the upper surface of the forming block, where it remains under the pressure of the spring 140 during any further downward movement of arm 131, and on the return of arm 131 the plate will be lifted by engagement of collar 138 with the upper end of the extension 139 on arm 131.

The lower ends of rods 133 to which the presser plate operating arm is secured are united by a rigid cross yoke 141, said yoke having a hole in each end in which the respective rod ends are fitted and secured by set bolts 142. Midway between the rods 133 the upper end of a cam fork 143 is bolted to the yoke 141. On the cam fork 143 is a roller stud 144, arranged to engage in a cam groove in the left hand face of the cam 145 secured to shaft 16ᴮ. The arms of the cam fork slide astride a collared hub on cam 145, and the groove in the face of said cam is so designed as to cause a dwell at each end of the reciprocating movement imparted to the rods 133 and parts carried by them, the longer dwell being at the end of the downward movement so that the presser plate will be held clamping the paper board blank to the top of the forming block while the folding and tin plate securing mechanisms are operating.

The mechanism thus far described is that which operates to move a paper board blank over the forming block, register it accurately thereon and clamp the central portion, which is to constitute the bottom of the tray, firmly between the presser plate and the top of the forming block. A blank having been so placed and clamped, a mechanism for folding the marginal portions of the blank downward over the inclined sides of the forming block comes immediately into operation.

The means for bending the marginal portions of the blank down over the sides of the forming block 113 while said blank is held clamped thereon, comprises four pivoted bending plates symmetrically disposed on a carrier casting adapted to reciprocate up and down above the forming block. The bending plates inclose between them a space corresponding to the space occupied by said forming block, when said plates are contracted. The bending plates carrier referred to is designated 146. It is supported on two vertically reciprocating rods 147, the upper ends of which pass through holes in said carrier and are secured thereto by set bolts 148. From its connection to rods 147 the carrier projects laterally toward the center of the machine at a downward inclination and terminates in a horizontal carrier head 149. As shown in plan in Fig. 3ᵃ the head 149 has reëntrant front and rear sides having lugs 150 projecting in the center fore-and-aft line of the machine. It also has a curved reëntrant left side 151, and an ovate opening 152 at its right side. Depending from the four corners of the head 149 are four lugs 153 disposed at the corners of a rectangle in planes fore and aft of the machine, and pierced to form bearings for the pintles 153ᵃ of a front and a rear hinged folding plate 155. The axes of each pair of said bearings are in line transverse of the machine. Disposed at the four corners of a rectangle symmetrically arranged within the rectangle defined by the bearing lugs 153 are four bearing lugs 154 lying in planes athwart the machine, the bearing openings of the respective pairs of which are in line fore and aft of the machine and are adapted to receive the pintles 154ᵃ of two side folding plates 156. To the face of each folding plate 155 and 156 respectively is detachably secured a face plate 157 and 158, as of hard steel, adapted to press the sides of the paper board blank against the inclined sides of the forming block 113. A number of interchangeable plates 157 and 158 are provided for different sizes of trays. Each of the plates has a bored pintle barrel for receiving the pintle, the barrels of the end plates being longer than those of the side plates, as shown. Each end plate 155 has a finger 159, projecting inward from the barrel at an angle to the hard steel facing plate that may be substantially the same as the angle between the top and sides of the forming block 113. These fingers 159 overlie the bosses 159ᵃ on the front and rear ends of the presser plate backing member 129 and contact with said bosses when the carrier head 149 descends. Similar fingers project from the side bending plates 156, and overlie similar bosses 159ᵃ on the side portions of said presser plate backing member 129. Each end folding plate 155 also carries a rigid pin 160 projecting upward from its pintle barrel located at the left side of the lugs 150. The two pins 160 are connected by a coiled spring 161 which is biased to pull the pins toward each and separate the end folding plates. Each end folding plate also has a lug 162 projecting from the pintle barrel at on obtuse angle with respect to the lug 159. Through each lug 162 is threaded a stop screw 163 which is so located that its end will contact with the end of lug 150 and limit the opening or spreading movement of the end folding plates under the influence of spring 161. The side folding plates 156 are provided with similar lugs and adjustable stop screws which act as stops and engage the reëntrant right and left sides of the carrier head 149, the right hand one moving in the ovate opening 152. Projecting upward from the pintle barrels of folding plates 156 are pins 164 somewhat longer than pins 160. The right hand pin 164 projects through an elongated opening 165 in the carrier head 149, and the left hand pin 164 plays in a notch 166 in the left hand reëntrant edge of said carrier head. The pins 164 are connected by a spring 167 which lies above spring 161, and tends to keep the folding plates 156 spread and the stop screws engaged with the reëntrant right and left hand edges of the carrier head 149. Thus the four hinged bending plates are normally held spread at the angles shown in Figs. 1, 2 and 4 to 9, which is a considerably greater angle than the sides and ends of the forming block 113 make with its top surface. The carrier head descends with the folding plates disposed at this wide angle and at this angle the plates engage the margins of the paper board blank and bend them downward into an incipient inverted tray. When the carrier head descends far enough for the fingers 159 to engage the bosses 159ᵃ on the presser plate backing member 129 the folding plates are thereby forced inward and carry the marginal portions of the blank or the sides of the incipient tray against the sides of the forming block (Fig. 10).

The means for reciprocating the carrier head 149 comprises the before mentioned rods 147 which slide through bearings 168 and 169 in the bridge frames 101 and 117, respectively. Beneath the bridge frame 117 a yoke 170 is connected to the ends of rods 147, each rod entering a hole in one end of the yoke and being secured by a set bolt 171. A cam fork 172 has its upper end bolted to the yoke 170 midway between the rods 147, and carries a roller stud 173 that engages in a cam groove in the left hand face of the cam 174. The fork 172 slides astride of and is guided so as to reciprocate vertically by a hub on the cam 174 secured to shaft 16ᴮ. The groove in the face of cam 174 is so designed as to give a slow downward initial movement to the carrier head 149, a final quick descent, brief dwell, quick initial and slow final upward movement.

The initial action of the bending plates upon a scored blank B is, therefore, to slowly bend its sides downward by engagement with its extreme edges and gently flex the paper board along the lines of scoring, and then, after the blank has been initially biased toward its final position, to quickly continue the bending and folding of the marginal portions against the inclined sides of the former. Owing to the disposition of the scores or creases the triangular corner portions, not engaged by steel face plates on the folding plates will bulge out laterally, there being a score or crease c where the end of each lateral side portion of the blank coincides with a corner of the forming block, but no corresponding score or crease on the blank where the front and rear side portions of the blank coincide with said corner, and a score or crease c midway between the stated lines, as shown in Fig. 31, illustrating the paper board blank B. The result is that the triangular corner portions f of the blank bulge laterally as flaps or ears adapted to be folded flat along the midway crease as illustrated in Fig. 31. Thus four two-ply triangular ears or wings project laterally from the corners of the blank clamped over the forming block.

At this stage of the operation means for folding the laterally projecting ears or flaps f flat against the lateral sides of the tray come into action. The said folding means comprises four curved arms 175 arranged in pairs, the arms of one pair being adapted to oscillate in a vertical plane toward and from each other at one side of the longitudinal center of the machine and the arms of the other pair being adapted to oscillate toward and from each other in a vertical fore and aft plane at the other side of the longitudinal center. On the inner face of the upper end of each arm is secured a folding block 176, the inner face of which is inclined to correspond to the inclination of the lateral faces of the forming block and arranged to move into engagement with one of the ears f of the incipient tray and fold it against the side. The lower inner corners of blocks 176 are well rounded as they are the first points to come into contact with the ears f and thus glide easily over them. Each block 176 is spaced from the side of the forming block a suitable distance, equal to say three thicknesses of the paper board of which the blank is made. The blocks 176 are detachably secured to the arms 175 and are interchangeable with others of a different size for different sizes of trays. In their operation the folding blocks of a pair approach each other and engage the paper board flaps, or ears f, just as the folding plates are about to retreat from engagement with the tray and while the presser plate 128 is still holding the tray down on the forming block. Here the folding blocks come to rest and hold the ears f while the folding plates retreat and move upward. As soon as the lateral folding plates have retreated far enough the folding blocks 176 again advance and fold the ears or wings f flat against the sides of the tray on the forming block. The folding blocks 176 and presser plate 128 remain holding the folded tray on the forming block 113 while the folding plates continue their upward movement; and while the tray is so held the tins t are brought up and clamped over the lateral edges of the tray and secure the ears or wings f flat against the sides, as will be presently described.

The lower ends of curved folding arms 175 are mounted on transverse shafts 177 and rigidly secured thereto by set screws 178. Shafts 177 are journaled in standards 179 that rise from the bridge casting 117. The two rear folding arms 175 are secured to one of the shafts 177 between the standards 179 and the two forward ones to the other shaft 177. The left hand ends of the shafts 177 project through the left hand bearings in the standards 179. To the projecting ends of each of the shafts 177 is rigidly secured a lever arm 180 having a hub sleeved over the shaft and fastened to it by a set bolt 181. The hubs of the arms 180 are reversed in position and the arms are in separated parallel planes. Each arm 180 is slotted as at 182. Between the arms 180 is the rectangular head 183 of a cam fork 184, which carries a roller stud 185 engaging a cam groove in the left hand face of a cam 186 secured to shaft 16ᴮ. The forked portion of the cam fork passes astride the hub of cam 186 and is guided thereby while the edges of the rectangular head 183 are guided between guide members 187 on the bridge casting 117. On opposite sides of the head 183 are studs 188 respectively engaging the slots 182 in levers 180. When, therefore, the cam fork 184 descends, the curved folding arms 175 move to position to cause the folding blocks 176 to fold the ears or wings $f$ of the paper board tray. The cam groove on the cam 186 is so designed as to give to the blocks 176 the movement described.

After the ears are folded and while the tray is held on the forming block 113 by the presser foot 128 and the folding blocks 176, two tins that have meantime been fed from a magazine, shaped into V-form in cross section and postioned below the lateral edges of the tray, are lifted, so as to embrace said lateral edges and are bent and riveted on said edges.

While a paper board blank was being fed from the magazine at the rear end of the machine to the forming block in the center of the machine, and a paper board blank was being shaped over the forming block, two rectangular blanks T of tin plate were being removed from a magazine at the other or front end of the machine, fed toward the forming mechanism and stamped into trough shaped blanks $t$ ready to be placed in movable jaws in position to be lifted and applied to the edges of the tray. Reverting in time, therefore, to the beginning of the already described cycle of operations the contemporaneous operations on the tin plate blanks whereby they are fed, preliminarily bent and placed in the devices for securing them upon the lateral edges of the tray held on the forming block, and the means by which said operations are performed will be described.

On that part or end of the framing that is herein designated the front end is a casting 200. It comprises a table 201 with guide ways and bearings and two inclined legs 202 having base flanges 203 provided with perforations for bolts 204 by which they are rigidly bolted to the upper surfaces of the front portions of members 12 of right side frame 9. The other or left side of the casting 200 is supported by a hollow casting 205 designed to function as an air chamber in connection with the mechanism for feeding the tin plate blanks T. Two lateral ears or flanges 206 on the casting 205 are bolted to the left hand edge of said table 201, and a horizontal base flange 207 on said hollow casting is bolted to the upper surface of the front part of member 12 of the left hand side frame 9.

In the top of the table 201 is a wide guide groove with under-cut sides 209, one of which is formed in a removable gib 210. Near the right hand side of the said wide under-cut guide groove a rectangular channel 211 is sunk, and midway of this channel is an opening 212 to admit the perimeter of a gear wheel. In the guide groove a feed plate 213 is fitted to reciprocate, and on the under side of feed plate 213 there is a rack 214 fitted in the channel 211. The rack 214 projects both forward and rearward of the general front and rear ends of the feed plate 213, and its rack teeth engage the teeth of the gear wheel 215 which project through the said opening 212. On each side of the fore and aft center line of the reciprocating feed plate 213 is bolted an angle plate 216 each having a horizontal and a vertical flange. The horizontal flanges of the angle plates 216 are provided with transverse slots 217, and on their under sides with guide ribs 218 of rectangular section which fit in corresponding transverse ways upon the feed plate 213. Bolts 219 pass through the slots into the feed plate and thereby secure the angle plates 216 adjustably to the feed plate so that they may be moved toward and from each other transversely of the machine. The reëntrant angles of said angle plates face each other and on the inner faces of the vertical flanges are bolted feed fingers 220, one on each side of the center line of the machine, whereby two tin plate blanks may be simultaneously fed. On the upper edge of each feed finger 220 are two steps forming two shoulders, a front shoulder 221 and an intermediate shoulder 222, while on the under side is a single shoulder 223.

Bolted to the table 201 on each side of the longitudinal center line is a guide member and forming die 224 for the tin plate blanks. These members 224 are similar and face each other, their longitudinal centers lying in the vertical planes that embrace the forming block 113. Each has a pair of horizontal flanges 225 projecting laterally from its under side, having transverse slots 226 therethrough and transverse ribs 227 on their under sides adapted to fit corresponding grooves in the table 200 and gib 210. Bolts 228 pass through said slots 226 thereby enabling said guide members 224 to be adjusted transversely toward and from each other. The inner faces of the guides 224 lie adjacent the path of movement of the feed fingers 220 for the larger portion of their length and then jut inward to constitute the die block 228 in which the tin plate blank T is formed into a V-shaped blank $t$. Beyond the die block the guide continues rearward toward the forming block in a grooved guiding extension 229. A mating guide member 230 is spaced from the upper part of the guide 224 between the die block 228 and the front extremity of said guide 224. Each mating guide member has a lateral flange 231 through which bolts 232ª are passed and threaded into the upper end surface of the member 224. In the space between guide 224 and mating guide member 230 the feed finger 220 reciprocates, its end entering and being guided by a groove in the bottom of the matrix of die block 228 and extension guide 229 and the shoulder 221 passing in a groove on the under side of flange 231. The upper surface 232 of guide 224 and mating guide 230 is flat and constitutes the surface on which the tin blanks T are deposited and moved toward the die block 228. At the front end, or deposit end, this surface is considerably wider than the tin plate blanks and is bounded by flanges 233 and 234 parallel for a portion of their extent and then converging as they approach the die block 228, and extending parallel again on each side of the matrix a distance apart equal to the width of the tins T. As the means to be described for depositing the tins on the surface 232 is not adjustable and has always the same amplitude of movement, it will be seen that the width of the surfaces at the point of deposit should be greater than the width of the tins by an extent sufficient to adapt said surface to receive the tins whether the guides 224 be adjusted to their positions of nearest approach or greatest separation, the converging portions 233ª and 234ª of the flanges 233, 234, causing the tins to register with the matrices of the die blocks 228 in any event. The die blocks 228 are preferably hardened.

The matrix mouth 235 in the die block 228 is considerably wider than the space between the members 224 and 230 in which the feed finger 220 reciprocates in order that the tin plate blank B may be pushed down into the V-shaped cavity 236 and formed into the blank t. The V-shaped cavity 236 of the matrix is overhung by ledges 237 which support the edges of blank T and engage over the edges of the blank t and hold it down, owing to the springiness of the tin plate, after it has been thrust and bent into the matrix. The V-shaped groove 238 in extension guide 229 is a direct continuation of the V-shaped cavity 236 of the matrix, and the upper surface of said extension guide 229 lies flush with the under side of the ledges 237 overhanging the V-shaped matrix cavity 236. A cover plate 239 of inverted U-shape is fitted removably over the extension 229 to keep the tin t from escaping from the groove 238, and has an upturned lip 240 that projects above the surface 232 on the top of the ledges 237 of the die block 228 to serve as a stop for positioning the tins properly over the matrix.

The tin blank guides, matrices, reciprocative blank pushers and supporting frame having been set forth, it is now needful that the means for depositing the tins on the guides and the means for operating the depositing means be described.

The tin plate blanks are held in two stacks in a magazine or hopper 241 located on the left hand side of the machine frame near the front end, as shown in Figs. 1 and 3, two tins being removed simultaneously, one from the top of each stack, and deposited, respectively, on the two tin plate blank guides 224—230, to be ultimately clamped on the two lateral edges of a tray held on the forming block 113. The magazine or hopper 241 consists of two similar upright channel guides 242 for the blanks, said channels being open at each end and at their left hand sides. The inner transverse flanges 243 of each channel guide is narrower than the outer flange 244. The channel guides are secured together by appropriate connecting bars and the hopper is provided with lugs 245 through which bolts 246 enter the left hand edge of table 201, and a horizontal flange 247 resting on the front end of member 12 of side frame 9 through which passes a bolt 248. Plates 249, adjustably secured to the vertical edges of flanges 244 of the channel guides by means of headed bolts 250 engaging through open ended slots in the plates 249, confine the tin plate blanks against lateral escape, while rendering the contents of the magazine or hopper visible. Other suitable means for confining the tins, such as hinged plates or doors, may be used instead of the slotted plates shown. The spaces between the edges of the flanges 243 and adjustable plates 249 also adapt the hopper to inclose two follower plates 251, integrally connected by a cross tie 252 through said spaces. The cross tie is supported by a projection 253, which has a threaded opening through which a rotary threaded rod 254 engages. In the embodiment illustrated the rod 254 has a left hand thread whereby a clockwise rotation imparted thereto at its lower end feeds upward the follower plates 249, and consequently the blanks resting therein. The upper end of threaded rod 254 is journaled in a cross web or plate 255 bridged across between the upper ends of the flanges 243 of the magazine channels. Its extreme lower end passes through a vertical bearing in a bracket 256 that is bolted to the inner side of the extension 14 on the lower front end of the left hand side member 9. The threaded rod also passes through an opening in the bracket 257 at the lower end of the threaded portion. Secured to the lower end of rod 254 is a hand wheel 258 by means of which the followers may be run down when desired, either to correct the adjustment or for the purpose of refilling the magazine.

The tin blanks T previously cut to the desired size and proportions fit neatly in the channels of the magazine. They may be stacked therein by hand by inserting a few at a time through the sides of the channels after opening or removing the plates 249, or by manually pushing a full height stack from an independent container that had been previously filled while the machine was in operation. The tops of the magazine channels are about level with the surfaces of the tin guides 224 and the tins are held in the magazine with their long dimensions transverse the lines of feed on the machine, whereby the automatic device, presently to be described, which lifts the blanks from the magazine, and which oscillates through an arc of 90° from the receiving to the depositing positions may deposit the blanks on the guide surfaces 232 in proper position with their long dimensions longitudinal of the machine.

Mechanism is provided to automatically feed the stacks of tin plate blanks upward at such a rate as to maintain the topmost blanks at the same elevation so that they may be picked off at each cycle in the operation of the machine by the automatic device referred to. This mechanism comprises a ratchet wheel 259 secured to threaded shaft 254, said ratchet wheel having a hub, the lower end of which rests on top of the vertical bearing on the bracket. Mounted to oscillate on the shaft 254 and with its under face resting on the upper face of the ratchet wheel 259, is a pawl-carrying plate 260 which is held down on the ratchet wheel by a collar 261 secured to the threaded shaft. To a pin projecting from the lower side of the pawl plate is pivoted a pawl 262, urged by a spring 262$^a$ into contact with the teeth of the ratchet wheel so as to turn it clockwise a partial revolution every time the plate 260 oscillates once. From the upper side of pawl plate 260 projects a pin 263, to which one end of a link 264 is connected. The other end of link 264 is connected to a pin 265 on a block or collar 266 that loosely surrounds the rod-like part 267, that slides in a horizontal bearing 268 on the said bracket 256 and is part of a cam fork 269. The collar 266 presses against a hooked pin 266$^a$, secured to rod 267, in one direction, and is urged in that direction by a spring 273. The pawl 262 has a short handle or tail piece 262$^b$ by which it may be manually held out of engagement with the ratchet teeth in order to permit the screw rod 254 to be rotated counter clockwise by the handle 258 in order to lower the followers 251. A spring detent 259$^a$ rests against the ratchet wheel to prevent a return movement of the screw 254 when the pawl retracts to engage another ratchet tooth in a manner well known in connection with ratchet and pawl mechanism. The cam fork 269 carries a roller stud 270 that engages a cam projection 271 on the perimeter of a cam 312 secured to shaft 16$^T$ the forked end of the cam fork passing astride a flanged hub on said cam 312. The compression spring 273 surrounding the rod 267 and bearing at one end against the slidable collar 266, bears at the other end against a shoulder formed at the junction of the rod 267 with the cam forked portion 269. Thus the collar 266 is pushed forward once at each revolution of the cam 262, or once in each complete cycle of the machine by the yieldable spring 273; and if any considerable resistance occurs between the collar and the magazine follower the spring 273 will yield and no damage be done. The hooked stop pin 266$^a$ has one end of a coiled tension spring 274 attached to it, the opposite end of said spring being attached to a stud or bracket 275 secured to the left hand side frame 9. Spring 274 holds the roller stud 270 on the cam fork 269 against the perimeter of the cam 312. The end of the rod 267 carries two nuts 276 which stop the inward movement of the cam fork toward the perimeter of the cam under the pull of spring 274 against the bearing 268, and may serve as an adjusting means to determine the extent of reciprocation of said cam fork and adjust the ratchet feed. The throw of cam 271 is so timed that the upward movement of the stacks of tins takes place when the oscillatory conveyer or feed arm is in its lowest position over the magazine and normally in contact with the topmost tins. If an overfeed has occurred the spring 273 will yield and prevent injury while at the same time the topmost tins will be kept snugly against the pneumatic face of the conveyer arm of the automatic feed device to be described.

The tins are removed from the top of the magazine in pairs and deposited in pairs on the wide portions of the surfaces 232 of guides 224 by an oscillatory hollow pneumatic conveying device 277, which is an angular body, seen in elevation, having a horizontal arm 278 and a vertical hollow shaft 279, the latter being fitted, air-tight, in the hollow casting or air chamber 205, before mentioned, so as to oscillate therein. The lower end of the hollow shaft 279 has a reduced solid end 280 projecting through the lower end of the casting 105, and to this end portion 280 the mechanism for imparting the necessary movements to the arm 278 is connected. Extending transversely of the hollow arm 278 on its under side near its end are two parallel, flat, oblong, slightly projecting faces covered, preferably, with flat plates 281 of brass or other non-magnetic material, holes piercing these plates and extending through the wall of the hollow arm 278. The plates are of a size and outline and are approximately spaced to fit suitably upon the uppermost tins in the magazine stacks. In the wall of the hollow shaft 279 is a lateral air port 282, which opens into a chamber 283 within the casting 205. A hollow branch of casting 205 extends transversely toward the center line of the machine and has a valve chamber 284, inclosing a valve seat 285, below which is a chamber communicating with a nozzle 284ª adapted to be connected to a conduit containing an exhaust fan or leading to any suitable means for withdrawing air. A valve 286 is arranged to open and close communication between the chamber and the exhaust connection. A valve stem 287, threaded to the valve 286 (which is adjustably held by a lock nut thereon) is guided in the lower wall of the valve chamber, and a continuation 288 of said stem extends through a removable cap 289 closing an opening on the upper side of the chamber 284. The orifice covered by the cap 289 is large enough to permit removal of the valve 286 therethrough. The lower end of valve stem 287 is threaded and passes through a hole in the offset end 291 of a cam fork 292, and is not adjustable here, simply locked, and secured thereto by threaded nuts 287ª. The valve is adjustably threaded and locked on its stem. The cam fork 292 carries a roller stud 293, which bears upon the periphery of a quick throw cam 294 secured on the hub of the adjacent cam 328 which is secured on shaft 16ᵀ, and the forked end slides astride an annularly grooved part of the hub of said cam 328. The cam 294 lifts the valve so that air may be withdrawn from the hollow conveyer arm at that portion of the cycle when the plates are to be lifted from the magazine and transferred to the guides 224 and releases the valve so that the weight of the valve, its stem and the cam fork 292 will seat it again when the tins are deposited on the said guides. When the valve 286 is open an air exhaust means (not shown) causes sufficient reduction of pressure within the conveyer arm to hold the tins against the faces of the plates 281, and when the connection with the air exhaust means is cut off by closure of the valve 286, there is sufficient seepage of air around the stem passage in the cap 289 to soon equalize the pressure again while the conveyer is at rest in position to release the tins. Obviously a vent and vent valve may be controlled by the said valve stem if desired.

In conveying the tins from the magazine to the guides, a down and up movement is imparted to the conveyer 277, in order to pick the tins from the magazine, and a down and up movement is imparted to said conveyer after the arm 278 has swung 90° from the magazine to the point of deposit. Mechanism to be now described is provided for imparting both the vertical and oscillatory movements to said conveyer.

Upon the reduced end 280 of the vertical shaft 279 is splined a miter gear wheel 295, as shown in Fig. 4, so that the shaft 280 and miter gear wheel 295 rotate together but the shaft may move vertically through the hub of said miter gear. The upper end of the hub of the gear 295 bears against the lower end of the hollow chamber 205 where the shaft extension 280 emerges, and a bracket bearing 296 bolted to the air chamber casting 205 supports said gear from beneath. The said bracket 296 (Figs. 1 and 4) also has two horizontal alined bearings in which a shaft 297 is journaled, said shaft carrying a miter gear 298 meshing with the miter gear 295. The hub of gear 298 bears against one face of one of said horizontal alined bearings, and secured on said shaft on the other side of the same bearing is a crank arm 299 having a hub lying against said bearing so that the shaft is secured against any lengthwise movement. The outer end of crank arm 299 is slotted at 300 (Figs. 1 and 2). A stud is adjustably mounted in the slot. On the stud is pivoted or swiveled a connector 302 having a hole at right angles to the stud 301, through which passes the threaded end of a cam fork 303 secured on each side of the connector by adjustable nuts 304. The cam fork 303 carries a roller stud 305 which engages a cam groove in the left hand face of a cam 306 secured on shaft 16ᵀ astride the hub of which cam 306 the arms of the cam fork reciprocate. The groove in the cam is so designed as to cause a dwell or period of rest at the end of each outward or inward stroke. The amplitude of movement of crank arm 299 may be varied by adjusting the stud 301 in the slot 300, and the locus, or beginning and ending points of the arc of oscillation may be changed by adjusting the nuts 304. The amplitude of throw of the cam is such that, with the transmission used, the arm 278 may oscillate through an arc of 90°, included between lines longitudinal and transverse of the machine intersecting at the axis of oscillation.

Stop brackets 278ª carrying adjustable stop screws 278ᵇ may be provided if desired one at each end of arc of movement of arm 278 to prevent any over movement of arm 278 toward depositing or picking up position in case of looseness of operating parts.

In order to impart the necessary up and down movement to the pneumatic feed device 277, the following described mechanism is provided:

Between two collars 307, secured to the lower end of the extension 280 of the vertical hollow shaft 279 (Figs. 1 and 4), is a collar 308 on the branched ends 309 of a cam fork 310 which carries a roller stud 311 engaging a cam groove in the cam 312 secured to shaft 16ᵀ. The groove in cam 312 is designed to impart two reciprocations to the cam fork 310 at each revolution and to produce a rest or dwell between each upward and downward movement. The said movements and dwells are timed with respect to the oscillations of the arm 278 so that the arm will drop to seize two plates, rest on them long enough to assure seizure, rise, swing to the point of deposit, drop, rest long enough to assure release after valve 286 is closed, again rise and swing back to initial position over the magazine.

Means for bending the tin plate blanks in the matrix of the die block 228 comprises a vertically reciprocative die head 313 arranged centrally of the longitudinal center of the machine, mounted on two vertical rods 314, arranged to reciprocate in bearings 315 in the rear end of table 201. The upper ends of the rods 314 are seated in holes in the die head 313 and secured therein by set bolts 316. The lower ends of said rods 314 are connected by a cross head 317, having holes at its front and rear ends, respectively, to receive said rods which are secured by set bolts 318. Midway between the ends of yoke 317, parallel, perforated ears 319 project from the under side. Between said ears 319 a pitman 320 is pivoted on a pin 321 projecting through said pitman and ears. The lower end of pitman 320 is threaded and passes through a swivel block 322, nuts 323 being secured on said threaded end of pitman 320, securing said swivel block adjustably on said pitman. The swivel block 322 is pivoted to the outer end of a lever 324 fulcrumed on the shaft 325 secured in the hangers 326 depending from the frame extensions 14. Between its ends, lever 324 carries a roller stud 327 bearing in a cam groove in the right hand face of cam 328 secured on shaft 16ᵀ. Removably secured to the right and left hand faces of the die head 313 are die plates 329, the lower edges of which are V-shaped in cross section and are substantially counter parts of the matrix grooves 236 in the die block 228. These plates 329 constitute male dies or matrices that coöperate with the matrices 236 to transform the flat tin plate blanks T into grooved or V-shaped blanks t, ready to be clamped upon the edges of the paper board tray on the forming block 113. Once during each revolution of the cam 328 the die head 313 moves downward forcing the die plates 329 into the matrix groove 236, and then moves back to its upper position. If a tin plate blank is then lying over the matrix block 228 it will be forced into the matrix, where its edges will expand and catch under the ledges 237, which hold it there while the die plates return upward. The die plates 329 are removably bolted to the sides of die head 313. In order that said plates 329 may be fitted to coöperate with the matrices whether the guides 224 and die blocks 228 are adjusted to wide or narrow trays, different plates 329 may be provided with different thicknesses of spacing blocks 329ᵃ. Or a series of separate spacing blocks adapted to serve as shims may be provided.

In order that the flat tin plate blanks T deposited on the guides 224 by the arm 278 may be fed to the die block 228, and the V-shaped blanks t stamped by the die plates 329 may be fed to the forming mechanism, the feed plate 213 carrying the feed fingers 220 must be reciprocated once during every cycle of the machine, so that the shoulder 221 of each feed finger, which shoulder projects above the surfaces 232 of the guides 224, may engage the ends of the tin plate blanks T and push them over the matrices 236 in die blocks 228; and the tips of the fingers 220 on the next forward movement will engage the V-shaped blanks t in the matrix grooves 236 and push them onward through the groove 238 to the clamping jaws, hereinafter to be described, which clamp the V-shaped tins onto the edges of the tray formed on forming block 113. To reciprocate the feed plate 213 the gear wheel 215, before mentioned, must be oscillated or alternately rotated in opposite directions. The gear wheel 215 is secured to a shaft 330 journaled in hangers 331 depending from the table 201. Secured to said shaft 330 on the right hand end, outside of the right hand hanger 331, is a pinion 332. On the said right hand hanger is a slide bearing 333 having a groove to receive and guide rack 334, said groove being closed by a face plate 335. The rack 334 has offset parallel end members 336 having alined perforations through which passes a rod 337 having nuts 338 threaded on its upper end outside the upper offset 336 on the rack. Above the lower offset a collar 339 is adjustably secured on the rod, and a coiled expansion spring 339ᵃ surrounds said rod, having one end bearing on collar 339 and the other end bearing upon the upper offset 336, whereby an upward thrust is applied yieldingly to the rack 334. The lower end of rod 337 is threaded into the upper end of a cam fork 340, which carries a roller stud 341, bearing in a cam groove in the right hand face of cam 342 secured on shaft 16ᵀ, and the forked arms of said cam fork are guided astride the hub of said cam 342. The groove of cam 342 is so designed as to give a dwell to the feed plate 213 at the limit of its movement to the stacking position and a quick reciprocation. Should the tins choke in the path of the feed finger the spring 339ᵃ will yield and no damage can result. The inclined shoulder 222 on the upper edge of each feed finger and the inclined shoulder 223 on the lower edge provide ample clearance to avoid frictional wear on cover plate 239 and engagement of the end of the finger with the die block 228 when the finger enters the channel below the V-shaped matrix groove.

The ends of guides 224 terminate at a vertical plane defined by the two vertical rearward disposed reciprocating rods 133 and 147. Separated from the ends of guide extension 229 by a space 343 for a purpose to be explained are guides 344 having V-grooves which are similar to the V-grooves 238 in extensions 229, and have a similar channel depressed below their apexes for the admission of the end of feed fingers 220, and the said feed fingers push the V-shaped tins $t$ formed in the die block 228 across the chasms or spaces 343 and into the grooves in guide members 344. The guides 344 are provided with angle plates 345 fastened to the upper face of each on the outer side of the V-groove each having one flange projecting obliquely downward into the V-groove so that its face is parallel with the outer inclined side of the V-groove and spaced from it a distance to admit, between it and the side it overlaps, one side of a V-shaped tin plate blank $t$ to prevent said blank from escaping from the groove when it is pushed into it by the end of a feed finger 220.

The guides 344 are mounted on parts adapted to reciprocate vertically, but which, at the lower limit of their movement, rest with the grooves in guides 344 registered with the grooves 238 in guide extensions 229. Each of said short guides 344 is part of a member 346, of which there are two, that supports the tin-clamping jaws 347 and 348 that are pivoted on each, and so formed and disposed that each pair of clamping jaws provides between the jaw faces when open a V-shaped groove in registration with the V-shaped groove of the guide section 344. At the rear end of each member 346 is an upward projecting bearing lug 346ª, having a bearing opening alined with a corresponding bearing opening in the rear end of guide member 344 below the groove therein. In these alined bearing openings of each member 346 is a pintle 349, the axes of said pintles lying in the vertical planes of the channels in the guide members 224 and 344, and just below the apexes of the V-grooves, so that the open jaws 347 and 348 pivoted on the pintles 349 constitute continuations of said V-grooves to receive the bent tins $t$. The members 346 are clamped to a reciprocating head 350 by means of bolts 351 which pass through said members 346 and through transversely extended slots 352 in the head 350, whereby the members 346 may be adjusted laterally to the same extent as the guides 224, to provide for correct positioning when different sizes of trays are shaped over the forming block and it becomes necessary to change the amount of separation of the guides and clamping jaws.

The clamping jaws 348 act upon the sides of the V-shaped tins that fit against the inner surfaces of the sides of the paper board tray, and the clamping jaws 347 act upon the sides that fit against the outer surfaces of the sides of the said tray. The said clamping jaws of each pair have interdigitating pintle barrels, there being one such barrel member on each outer jaw 347 fitting between two on the other jaw 348, the pintle 349 of each pair passing through the three alined barrels and the bearing holes in the jaw supporting members 346. The clamping face of each jaw 348 is composed of a hard steel plate 353 having a flat face from which protrude four spurs 354 having an oblique end adapted to strike a spur or integral rivet from the tin $t$ and drive it into the paper board of the tray edge when the jaws are closed upon it. The face of each mating jaw 347 is composed of a hard steel plate 355 having a surface that is rabbeted at its opposite ends as at 356, and small rounded cavities 357 opposite the two intermediate spurs 354 of the plate 353 of the mating jaw. The rabbeted ends close upon the folded flaps or ears $f$ of the paper board tray and the mid portions close upon the sides of the tray between said ears. The rivet points struck from the tins by the inner jaw plates are driven through the paper board sides of the tray and riveted or clenched by striking the rounded cavities pressed into the outer side of the tins by the coaction of the spurs and cavities of the opposed jaw plates. The outer sides of the tins, when clamped in place, will have neatly embossed small rounded projections midway between the folded paper board flaps or ears, and the portions of the tins over the ears will be smooth, there being three layers of paper board between the sides of the tin which provides a thickness sufficient for the rivets struck from the inner side of the tins to be driven straight in, without clenching.

The reciprocating head 350 is perforated in its center for the passage of a rod 358, and is perforated symmetrically on opposite sides of the center for the passage of rods 359. Each rod 359 is provided with a head 360 having a groove 361 adapted to engage a pin 362 projecting rearward from the rear side of an arm 363 rigid with the jaw 347. On the upper end of rod 358 is a cross head 364 having a groove 365 on the front and rear sides, respectively, each extending part way across the face of said head from an open end. Pins 366 projecting from arms 367 extending toward each other from the jaws 348 engage the grooves 365 in the head 364. The rods 358 and 359 therefore operate to open and close the jaws by a vertical movement with reference to the head 350.

The rods 358 and 359 are rigidly connected by a yoke 368 through which said rods extend. The rod 358 is pinned to said yoke at 369 and the rods 359 are provided with threaded portions above and below the yoke on which are clamping and adjusting nuts 370. The head 350 is supported by expansive springs 371 and 372 surrounding the rods 358 and 359, respectively, their lower ends resting on the yoke 368 and their upper ends on the head 350. The lower end of rod 358 is threaded and connected by a turn buckle 373 to the threaded upper end of a cam fork 374 that carries a roller stud 375 bearing in a groove in the left hand face of a cam 376, secured to shaft 16$^B$. The forked end of cam fork 375 reciprocates astride of the hub of cam 376.

Projecting from the upper face of head 350 are two pins 377 arranged to strike against the under side of forming block 113 and stop the upward movement of said head 350 when pushed yieldingly upward by the rod 358 under the influence of cam 376, acting through the yoke 368 and the springs interposed between the yoke and the said head 350. The under side of the former 113 against which the pins 377 contact is correspondingly higher on the shallower formers 113 than on the deeper ones, hence the length of pins remains constant. When the head stops, the jaws will be in position to close and clamp the tins to the longitudinal edges of the tray on the former. Continued movement of the rod 358 and 359 closes the jaws. The jaws when closed have their faces inclined the same as the inclination of the tray sides.

By adjusting to position the nuts 370 on the rods 359, the latter may be so adjusted in position with respect to the yoke 368 that the clamping pressures of the two sets of tin clamping jaws may be nicely adjusted. By means of the turn buckle 373 the tin blank lifting and clamping mechanism may be accurately adjusted to position the bottom of the V shaped tin blanks in the clamping jaws snugly against the lower side edges of the tray on the former 113, and when the machine is set up for making shallow trays adjustment of the turnbuckle may be so as to elevate the jaws to cause the bottoms of the tins to meet the under edge of the shallow trays.

The cross cavity 114 on the under side of forming block 113 provides clearance for the operating head 364 on the upper end of rod 358, and the longitudinal rabbets 115 on said forming block provide clearance for the inner sides of the V-shaped tins and inner jaws 348 as they clamp upon the edges of the paper board tray.

Threaded through the yoke 368 are two adjustable stop screws 368$^a$ that are secured by lock nuts in adjusted position and serve to limit the downward movement of the yoke in order to aline the guides 344 with the guide extensions 229. The width of the groove in the face of cam 376 is greater than the diameter of the roller stud 375, in the concentric or delay portion 376$^a$ of said groove. The turn buckle 373 and screws 268$^a$ provide for accurate setting and adjusting of the tin clamping jaws and carriers.

When the turnbuckle 373 is adjusted to elevate the clamping jaws to engage the under edges of shallower trays, as when the machine is adjusted for making such trays, the adjusting screws 368$^a$ are elevated also; hence the reciprocative distance or amplitude of movement necessary to bring the bottoms of the V-shaped tins into contact with the under edges of a shallow tray is greater than is necessary to bring the said tins into contact with the edges of a deeper tray. For this reason, when the forming mechanism is adjusted to form the shallowest tray, the jaws must reciprocate the greatest distance. The widened portion 376$^a$ of the cam groove in the face of cam 376 permits of the said difference in amplitude of movement, as required by the various heights of trays that can be made on the machine. When the deepest trays are being made the clamping jaw lifting mechanism is adjusted so as to move said jaws upward to the lowest upper limit of their possible movement when in position to engage the under edges of the tray on the former 113. Hence when the deepest trays are on the former the amplitude of the reciprocative movement of the lower ends of screws 368$^a$ above the bridging member 117, is the minimum. Under conditions existing when a deep tray is on the former the cam roller 375 will be held a distance above the lowermost possible limit of its throw by the ends of screws 368$^a$ resting on the casting 117. As the outer wall of the cam groove can move the cam roller 375 downward only the minimum distance screws 376$^b$ are inserted in the cam and adjusted so as to force the cam roller downward, or into contact with the inner wall of the groove when the machine is adjusted for shallow trays, in case gravity should fail to pull the cam fork to the lowest limit.

When the jaws 347 and 348 rise to carry the tins upward against the edges of the tray, means are provided to prevent the possibly expanded ear tips at this time from coming into contact with the outer jaws or the outer side of the bent tin held thereon, so that the tins may be clamped over them to finally confine them in place. The said means comprise two members 378, secured respectively to the outer sides of the jaw supporting members 346. Each of these members 378, viewed from the right or left side of the machine in side elevation, has the general apearance of an inverted letter U, the ends of the arms being removably secured by screws or bolts to the outside edge of a member 346. The top cross member projects laterally inward toward the center of the machine and then extends upward in a sort of goose neck 379, as seen in end elevation, having its inner face beveled extending from its top downward and inward as shown at 380. As the members 346 carrying the tin clamping jaws rise, the beveled face 380 wipes up along the sides of the folded ears and presses them within the V-shaped tins while the latter are being placed to embrace the edges of the tray, including the ears, and being compressed upon the edges to bind said edges with tin and secure the flaps or ears permanently in position.

In order to stop the V-shaped tins in exact position between the clamping jaws when they are shot rearward by the end of the finger 220, a resilient wire stop 381 is arranged across the path of the tins entering each pair of jaws. The wire stops 381 are secured by headed screws 382 to the rearward limb of each inverted U-plate 378. The screws 382 pass through eyes formed in the wire by coiling the wire. The eye-bearing portion of each wire stop extends vertically on the outside of the rearward limb of the inverted U-plate 378, then rearward in the same plane, then inward at right angles and lies across the path of the incoming V-plates just within a V-shaped transverse notch 383 in the upper side of the rear bearing lug 346ª, said notch 383 intersecting a longitudinal notch alined with groove in guide 344. The wire stop 381 checks the overthrow of single tins entering the jaws, but should a tin fail to be applied in a single cycle and a second incoming tin enter the jaws while still occupied by the abortive tin, the wire will yield and allow the abortive tin to escape.

The tins having been clamped upon the side edges of the paper board tray, the clamping jaws and carrier head descend; the presser plate 128 which held the bottom of the tray on to the top of the forming block ascends, and leaves the completed tray resting loosely over the forming block, and ready to be ejected from the machine. In order to remove the tray it is first lifted above the forming block 113, and then pushed endwise into a trough or chute, where it rests until another tray similarly manipulated moves it onward a step, and thus successively manufactured and ejected trays form a procession in the discharge trough along which they are moved step by step, and drop one by one from the discharge end of the discharge trough.

A means for lifting the trays above the forming block 113 comprises a horizontal U-shaped casting 385, having bore holes at the junction of the limbs 386 and the cross member of the U-shaped casing, sleeved over the vertical reciprocating rods 133 on the left side of the machine beneath the bridge casting 101. The arms 386 project toward the right hand side of the machine, and the arm 386 that is nearest the front of the machine or tin-plate-blank magazine, is arranged to reciprocate through the chasm or space 343 separating the guide end 229 from the guide section 344 carried on the left hand jaw-holding member 346. The free end of each arm 386 is formed with an offset head 387, rectangular in plan, and having fore and aft rabbets formed in the upper sides of the right and left ends of said rectangular head. Bolted to each head 387 and seated in the rabbets are two members, each carrying a longitudinally extending straight edged plate 389, serving as track members. The ends of the plates 389 that project toward the forming block 113 overlap the ends of said forming block and are adapted to pass through open ended slots 390 formed in the ends of the forming block from top to bottom and slightly offset from the seats 121 for the spring pressed blades 124 in said forming block 113. The rods 133 to which the lifter arms carrying the track and lifter plates 389 are secured, also carry the arm 131 which moves the presser plate 128 up and down. While the tray is being formed the rods 133 remain in their lowered position, holding down the presser plate, but after the completion of the tray the rods rise, carrying the presser plate upward and releasing the tray. The arms 386 then also move upward, and lift the plates 389 which engage under the edges of the tray, pass upward through the slots in the forming block provided for this purpose, as illustrated in Fig. 11, and elevate the tray until its lower edge is flush with the upper edges of the spring pressed blades 124 in the top of the forming block. The top edges of the blades 124 and the top edges of the plates 389 now form a continuous two-rail track over which the tray may slide into the discharge trough or chute 390, and the incoming blank may slide over the forming block. The beveled corners 127ª of blades 124 obviate the chance of the arms 389 catching under the ends of blades 124 during this movement.

The lifter plates 389 may be made with blocks 389ª of different thicknesses or different thicknesses of filler blocks may be provided so that lifter plates may be secured to the arms 386 separated more or less to correspond with different sizes of forming blocks 113 that may be used.

The discharge chute or trough 390 is elevated over the tin plate blank feeding and forming mechanism, and the receiving end of its bottom constitutes a guide way in continuation with the tops of the lifter plates and tracks 389, as shown best in Figs. 6 and 8. The sides 391 are spaced sufficiently to permit the passage of the widest trays made by the machine. The walls at its receiving end flare outward as at 392, and the bottom is notched as at 393, the forward ends of the forward lifter plates 389 coming within the notches when the plates are elevated so as to overlap the bottom in order that the transverse edge of a tray may not catch at the point of transference from the plates 389 to the trough. The surface of the trough should preferably be just slightly lower than the tops of blades 124 when in their elevated position.

In order to push the completed and elevated tray supported on the lifter plates 389 into the trough 390, pusher rods 394 and 395 are connected to the paper board blank feeding bar 45, so that the feed motion of said bar 45, while advancing to feed a paper board blank to the forming block, will at the same time push the formed tray into the trough. The pusher rods 394, 395, have ends turned at right angles to the length of the rods, parallel with each other and projecting toward the center line of the machine. The front transverse ends 394ª and 395ª are in line with each other, and their front sides are adapted to engage symmetrically against the end of a tray as indicated in Fig. 6. Their rear transverse ends are inserted in holes formed in a block 396 projecting upward from the rear end of bar 45, the end of rod 394 passing through said block rearward of the end of rod 395, as shown in Fig. 3. In order to sustain the pusher rods in horizontal position, they are guided in notches 397 formed in guiding members 398 on the ends of the described bridge member 83 under which the paper board blanks are fed. The discharge of a completed tray by the action of the pusher is the final act in a complete cycle of the mechanism described, but is effected by a movement and in unison with other acts initiating a cycle.

Although the mode of operation has been described in connection with the detailed description of the construction and operation of the several specific mechanisms that coöperate in the automatic manufacture of a tray, a general description of the mode of operation will be here given in recapitulation:

Paper board or other tray blanks B having been stacked by hand in the magazine formed by the angled uprights 34 near the rear of the machine, with their front portions overlying the lip 89, and two stacks of sheet metal blanks having been placed in the magazine 241 provided for them near the front of the machine, and the followers 251 adjusted so as to bring the topmost tin blanks T to the top of the magazine, the machine is ready to be started. At the commencement of a cycle, two tin blanks t are resting in the matrix grooves 236, the feed bar 45 and finger 51 are at their rearward limit, and the feed finger 220 is at its front or starting position; the pneumatic conveyer arm 278 is over the tin plate magazine, the die head 313, elevated, presser plate 128, and folding plates 155—156 elevated, folder arms 175 retracted, metal blank lifting and clamping jaws 347, 348, open and depressed into alinement with guides 229, lifter arms 386 elevated so that the top edges of plates 389 are level with the upper surface of the tables 30 and trough 390.

As the main shaft 16 turns, the tray blank feed finger 51 advances, the spring pressed finger tip 55 engages the near edge of a blank B and pushes it forward beneath the bridge member 83; the throat member, comprising the lip 89 and plate 95, receives the advancing blank B and the continuing forward movement of the feed finger pushes it through the throat under the holding plates 99, 100, across the elevated lifter plates 389, over the blades 124 in the forming block 113, the edges of the blank being guided by the side guides 108, and stopped by the stop blocks 111, properly registered over the forming block.

Meantime, the pneumatic conveyer arm 278 has dropped so as to bring the perforated plates 281 onto the two top blanks T in the magazine 241, the valve 286 has opened and the air pressure has been reduced in the arm 278; the arm 278 then lifted, swung 90°, dropped so as to place the blank T longitudinally on the surfaces 232 of the guides 224, the valve 286 closed, releasing the blanks T on the guides.

At this time the presser foot 128 descends onto the blank B and clasps it onto the top of the forming block 113. The lifter arms 386 and plates 389 also descend. Immediately also the folding plates 155, 156, come down, and said plates, opened at wide angles, engage the marginal portions of the blank B and first bend them slowly downward until the fingers 159 on the folding plates engage the bosses 130 on the backing plates 129, whereupon the folding plates quickly press the sides of the blank B against the flaring sides of the forming block 113, leaving flaps or ears f protruding laterally, bent at the creases c. c. The folder arms 175 move toward each other, the heads 176 engage the flaps f, bend them somewhat and rest holding the flaps. The folder plates now start to open and ascend, and the heads 176 move pressing the flaps f against the sides of the tray on the forming block.

The feed fingers 220 have also moved and engaged the tin blanks T deposited on the guides 224 by the shoulder 221 and pushed them over the die blocks 228. The ends of the fingers 220 have at the same time engaged the V-shaped tins $t$ in the matrix groove 236 and pushed them into the jaws 347 and 348.

The jaws 347 and 348 now rise, carrying the tins $t$ into engagement with the side edges of the tray clamped on the forming block 113. The surfaces 380 on the members 378 now engage the flaps $f$ and assist in holding them against the sides of the tray, and the jaws 347, 348, close, clamping and riveting the tins securely over the lateral edges of the tray and confining the flaps $f$.

The fingers 220 move back to initial position; the die head 313 presses the tins T, left resting on the die block 228, into the matrix groove 236, and the arm 278 swings back to initial position over the magazine 241.

Also the presser plate 128 ascends, releasing the now fully formed tray and the lifter arms 386 moving upward at the same time, cause the plates 389 to engage under the edges of the tray and lift it to a level with the trough 390.

At the beginning of the cycle the pushers 394, 395 moved over the forming block 113. At the beginning of the next cycle they again move, coming in contact with the completed tray and push it into the trough or chute 390, where it rests a cycle, to be advanced step by step at each succeeding cycle of operation, pushed along by the successive trays similarly produced and handled until it is discharged from the discharge end of the trough.

In Fig. 31, reading from left to right, are shown, first the paper board blank B; second, the incipient tray folded by the folding plates 155, 156, with the flaps $f$ projecting; third, the completely folded tray ready to receive the tins $t$; and fourth, the completed tray bound with a sheet metal binder.

In Fig. 33, T illustrates the tin or sheet metal blank as it is when it arrives on the die block 228, and $t$ illustrates it as it is when shaped in the matrix 236, ready to be clamped on a side edge of the tray.

Fig. 32 indicates diagrammatically the initial position of the paper board or tray blank at B, at the rear end of the machine, the position of the blank T on the guides 224 at the front end of the machine on a lower level, the position in which blank T is bent into the V-shaped blank $t$, the mid-position where the two blanks are united, and the procession of finished trays traveling over the path of the tin blanks to the point of discharge of said finished trays from the machine.

The organization described and illustrated is compact and simple. The tray blanks and sheet metal binding blanks are fed from opposite ends of the machine, on different levels, united at the center, and the finished trays passed on out of the machine over the path of the sheet metal blanks. The mechanism is assembled within narrow compass; devices utilized for advancing the tray blanks are also utilized for discharging the finished trays. All forming and guiding mechanism is adjustable whereby within the range of adjustment any size of tray may be automatically produced. All parts of the operating mechanism are convenient of access to the operator standing at the control at the left side of the machine.

The trays made by the described mechanism are particularly designed for use as so called scale-pan trays for the reception of butter, lard or the like, the metal bound edges serving not only to confine the corner flaps and strengthen the container, but also to serve as a scraping edge by which lard or other substance adhering to a paddle or spatula by which the material is filled into the container may be scraped from it. The metal borders are riveted firmly to the side edges by reasons of the triangular points struck from the inner side of the metallic binding and driven into the paper board or other material of which the tray is formed. The two intermediate points are clenched and the bosses on the other side opposite the clenched intermediate points produce a neat finish on the binding in addition to affording security of grip on the edge of the container by coöperation with the points or integral rivets that enter the concavities formed thereby on the inner side.

Having described my invention in the best form now known to me what I claim and desire to secure by Letters Patent of the United States is:

1. In a tray forming mechanism, the combination of forming devices, means for feeding blanks singly to said forming devices including a blank support, means for holding the blanks flat upon said support, guides at opposite sides of said forming devices beneath which the edges of the blanks are adapted to slide, and stops on said guides adapted to register the blanks with the forming devices.

2. In a tray forming mechanism, tray forming devices, a support and guide way for blanks, means for holding the blanks flat upon the support while being moved toward the forming devices, guides on opposite sides of the forming device consisting of angle irons having one flange adapted to overlie the edges of the blanks and having the end into which the blanks enter flared to properly center the incoming blanks.

3. In a tray forming mechanism, the combination of a forming block, lateral angle guides at each side of said forming block with their horizontal flanges slightly above the upper surface thereof, and stops at the ends of said guides arranged to stop the blanks in proper position over the forming block.

4. In a tray forming mechanism, a forming block, a support therefor, means for removably securing the forming block to the support, guides for the edges of a sheet blank on opposite sides of the forming block, the guides being adjustable to and from said block, and an adjustable stop on each guide.

5. The combination of a forming block, spring pressed blades fitted in cavities in the top of said block projecting above the upper surface thereof and adapted to be pressed back flush with the block.

6. In a tray forming mechanism, a forming block, spring pressed blades seated in the top of said forming block, a spring pressed presser plate corresponding in form and area to the top of said forming block, and means for causing said plate to descend upon or recede from said forming block.

7. In a tray forming mechanism, a forming block, a guideway over which blanks are fed to the forming block, spring pressed blades seated in the forming block and normally on a level with the tray blank guide.

8. In a tray forming mechanism, a forming block, a guideway for tray blanks approaching the forming block on one side of said block, a guideway for trays extending from the opposite side of the block, spring pressed blades seated in said block with their tops normally substantially level with the guideway for the blanks and with the bottom of the guideway for trays.

9. In a forming mechanism for trays, a forming block, having substantially vertical slots through its opposite ends, tray lifting blades and means for causing them to reciprocate vertically through said slots in the block for removing a finished tray from the block.

10. In a tray forming mechanism, the combination of a forming block having transverse slots through its ends, lifting blades and means for causing them to reciprocate up and down through said slots, spring pressed blades seated on said block, the seats for said blades lying in juxtaposition with said slots and overlapping them whereby when the lifting plates are raised they will break joint with said blades.

11. In a tray forming mechanism, a forming block, spring pressed blades seated in the top of said forming block, slots through the ends of said forming block and overlapping the seats for said blades, lifting plates and means for causing them to reciprocate through said slots, a guide surface for the tray blanks at one side of said block, a guideway over which the finished trays may be discharged at the opposite side, means for feeding a tray blank across lifting plates and onto the blades, and ejecting means arranged to discharge the finished trays across the lifting plate and onto the discharge guideway.

12. In a tray forming mechanism, a forming block, vertically reciprocating rods at one side thereof, a bracket secured to said rods and overhanging the former block, a rod vertically movable through the ends of said bracket over said forming block and carrying a presser plate at its lower end, a spring surrounding said rod and tending to press the presser plate downward, means for limiting the descent of the presser plate with respect to said overhanging bracket, arms connected to said vertically reciprocating rods and projecting beneath the forming block, tray lifting plates connected to said arms whereby when the presser plate ascends to release the formed tray the lifting plate will elevate said tray above the forming block.

13. In a tray forming mechanism, the combination of a forming block, a support for a stack of blanks arranged substantially on a level with the top of the forming block, a reciprocating device adapted to pass beneath the stack of blanks and push one over the former, an ejector secured to the reciprocating device and arranged to advance over the top of the former, means for forming the blank into a tray on the forming block, means to elevate the formed tray above the former into the path of the ejecting devices.

14. In a tray forming mechanism, the combination of a forming block, means for feeding blanks thereto, and means for forming a tray over said forming block, a device for elevating the formed tray above the block, ejector fingers connecting to the blank feeding member and arranged to push a formed tray from its position over the forming block synchronously with the feeding movement of a tray blank.

15. In a tray forming mechanism, a support for a stack of blanks, a reciprocating feed finger adapted to move back and forth beneath the stack, and an ejector device for formed trays comprising a pair of arms connected to the reciprocating feed device and passing on each side of the stack into position to engage a finished tray.

16. In a tray forming mechanism, a support for a stack of blanks, a magazine for holding said blanks in position on the support, a reciprocating member movable beneath the stack, arms connected to the feed member and passing on each side of the magazine, guides for the arms, the forward ends of said arms being bent toward each other, and a forming block for tray blanks, the said arms being adapted to reciprocate above the forming block.

17. In a tray forming mechanism, a forming block, means to clamp a blank of sheet material thereon, sheet bending devices, means to cause a relative movement of the said forming block and bending devices in order to bend the blank over the forming block, said bending devices being disposed so as to first engage the blank at its outer edges.

18. In a tray forming mechanism, a forming block, means to clamp a blank of sheet material thereon, a carrier bending plates pivoted thereto, and normally held at a wide angle with respect to the sides of the forming block, means to cause a relative movement between the forming block and said carrier whereby the bending plates first engage the outer edges of the sheet blank, and means for thereafter causing the bending plates to contract and bend the sides of the blank against the sides of the forming block.

19. In a tray forming mechanism, a forming block, means to clamp a blank of sheet material thereon, a carrier, movable relative to the forming block, bending plates pivoted to the carrier, means tending to hold the bending plates at a wide angle so that they will first engage the edges of the blank of sheet material, lugs on the bending plates projecting over the forming block adapted to engage the clamping means as the carrier and forming block approach each other and cause the bending plates to bend the sides of the sheets against the sides of the forming block.

20. In a tray forming mechanism, a forming block, means to clamp a blank of sheet material thereon, comprising a presser plate, a carrier movable relative to the forming block, bending plates pivoted to the carrier, springs tending to hold the bending plates at a wide angle with respect to the forming block so that they will first engage the edges of the sheet blank, lugs on the bending plates projecting over the forming block and adapted to engage the presser plate to cause the bending plates to bend the sides of the sheet material against the sides of the forming block at the limit of the approaching movement between the carrier and the forming block.

21. In a tray forming mechanism, a frame, a forming block, a vertically movable means at one side of the frame carrying an arm overlying the forming block, a presser plate, having a movable connection to said arm, a compression spring between the arm and presser plate, a vertically movable means at the other side of said frame carrying a head, bending plates pivoted to said head, means whereby descent of the head causes the bending plates to engage the presser plate and operate the bending plates, and mechanism for operating said vertically movable means in proper time relation.

22. In a tray forming mechanism, a forming block, sheet bending devices adapted to bend the sides of a tray blank against the sides of the forming block and permit corner flaps of the bent blank to protrude laterally between the bending devices, and means for folding the protruding corner flaps against the sides of the tray on the forming block.

23. In a tray forming mechanism, a forming block, means for clamping a tray blank thereon, means for bending the sides of the blank against the sides of the forming block so as to leave corner flaps protruding between the bending devices, folding devices for engaging the protruding flaps, means for then moving the bending devices away from the forming block, and means for thereafter advancing the flap-folding devices and pressing the flaps against the sides of the tray upon the forming block.

24. In a tray forming mechanism, a forming block, means for clamping a tray blank thereon, means for bending the sides of the blank against the sides of the forming block so as to leave the corner flaps protruding between the bending means, arms having folding heads adapted to approach each other and press the protruding flaps of the tray against the sides thereof on the forming block, and means for moving said arms toward and from each other.

25. In a tray forming mechanism, a forming block, a pair of pivoted arms, folding heads on said arms, and means for moving said arms so as to cause said folding heads to approach each other substantially parallel with and in proximity to a side of said forming block.

26. In a tray forming mechanism comprising a forming block, and devices to bend a sheet blank upon the forming block, pivoted folding arms having folding heads adapted to approach each other at one side of and in proximity to a side of the forming block, means for causing the bending devices to first bend the sides of a blank against the forming block, means to cause the pivoted arms to approach each other into position to cause the folding heads to engage the protruding flaps of the blank and rest, means for causing the bending devices to retreat, and means for causing a further approach of the pivoted arms and folding heads to press the flaps against the sides of the tray on the forming block.

27. In a tray forming mechanism, a forming block, a tray blank guiding surface substantially at the level of the top of said forming block, over which tray blanks may be moved to the forming block, a discharge way for trays substantially at the level of the top of said forming block, a lifting device having plates adapted to engage under the edge of a tray on the forming block and lift it from said block, said plates arranged when elevated to constitute bridging guides between the guiding surface, discharge way and the forming block.

28. In a tray forming mechanism, a forming block, tray blank guiding means for guiding tray blanks to a position over the forming block, slots extending through said forming block, means for forming a blank on said block into a tray, lifting plates adapted to reciprocate through said slots, means for actuating said tray forming means, and mechanism timed and adapted to elevate the lifting plates and lift a formed tray from the forming block.

29. In a tray forming machine, tray blank guiding means, and a tray discharging chute, a tray forming block disposed between them, slots extending through said block, means for forming a blank on said block into a tray, lifting plates adapted to reciprocate through said blocks so that their upper edges bridge the spaces between said guiding means, chute and forming block, means for actuating said tray forming means, mechanism timed and adapted to elevate the lifting plates and lift a formed tray from the forming block, and means for moving a formed tray into the chute.

30. In a tray forming machine, an elongated frame, tray forming mechanism supported by the frame between the ends, tray blank feeding mechanism disposed on the frame at one side of the tray forming mechanism and adapted to feed tray blanks to said forming mechanism, means for feeding sheet metal blanks disposed on said frame at the other side of said forming mechanism and arranged to feed blanks to the latter in a direction opposite the path of movement of the tray blanks and devices for clamping the sheet metal blanks to the edges of a tray held at the place of forming.

31. In a tray forming machine, frame, tray forming mechanism mounted thereon, means for feeding tray blanks to the forming mechanism, means for feeding sheet metal binding blanks to the forming mechanism from a direction opposite that of the tray blank feed, means for securing sheet metal blanks to the edge of a tray at the place of forming, and means for ejecting a completed tray in a path parallel with that of the sheet metal blanks being fed and in the opposite direction.

32. In a tray forming mechanism, a frame, tray forming mechanism thereon, means for feeding tray blanks to the forming mechanism, means for feeding sheet metal blanks from a direction opposite and in a plane lower than that of the tray blank feed, means for uniting the sheet metal blanks to the edges of a formed tray at the place of forming, a discharge way for the completed trays above the sheet metal feeding devices, and ejector mechanism for moving the completed tray onto said discharge way in a direction opposite that of the sheet metal blank feed.

33. In a tray forming mechanism, the combination of a frame, a tray forming mechanism thereon, means for feeding a tray blank to the forming mechanism, means for feeding sheet metal blanks from the opposite direction, means for clamping the sheet metal blanks onto the edges of a completed tray at the place of forming, a discharge way above and parallel with the path of the sheet metal blanks, and an ejector operated by the tray blank feeding mechanism for moving the finished trays onto said discharge way in a direction opposite that of the sheet metal blank feed.

34. In a tray forming mechanism, the combination of a forming block, means for feeding a tray blank into registration with the block, means for forming the tray upon the block, means for feeding sheet metal blanks from the direction opposite that of the tray blank feed to position below the edges of the forming block, means for clamping the sheet metal blanks upon the edges of a formed tray upon the forming block, means for lifting the formed tray from the block, a discharge way in substantially the same plane as the tray blank feed, and above the path of the sheet metal blanks, an ejector operated by the tray blank feeding mechanism for pushing the completed trays onto the discharge way.

35. In a tray forming mechanism, a frame, a tray forming mechanism thereon, means for feeding tray blanks thereto, means for feeding sheet metal blanks thereto from the side opposite the tray blank feeding mechanism and on a lower level, means for bending the sheet metal blanks while on their way to the forming mechanism, means for clamping a bent metal blank to the edges of the formed tray, a discharge way for the completed trays above the feeding and bending mechanisms for the metal blanks, and means for ejecting said tray into the discharge way.

36. In a tray forming mechanism, the combination of a forming block, a tray blank guide substantially level with the top of said forming block and means for feeding tray blanks over the guide and forming block, means for forming a tray upon the block, mechanism for feeding sheet metal blanks to a position beneath the edges of the formed tray, means for clamping said blanks upon the tray, mechanism for lifting the tray blanks above the forming block, a discharge way substantially level with the top of the forming block above the feed mechanism for the sheet metal blanks, ejecting means carried by the tray blank feed mechanism adapted to push the finished tray into the discharge way.

37. In a tray forming machine, a forming block, means for folding a tray blank on the forming block, mechanism for feeding sheet metal blanks to a position beneath the edges of the forming block, means for securing said sheet metal blanks to the edges of a folded tray on the block, tray lifting devices, a discharge way above the feed mechanism for the sheet metal blanks, and means for pushing a lifted tray on to the discharge way.

38. In a tray forming mechanism, a forming block, means for clamping a tray blank to the top thereof, devices for bending the sides of the blank upon the sides of the forming block, means operated independently of the bending device for folding the corner flaps against the sides of the tray, and devices below the forming block arranged to clamp sheet metal binding blanks to the edges of the tray and to secure the flaps thereto.

39. The combination of a forming block, bending devices adapted to bend the sides of a blank into contact with the sides of the forming block, folding devices operating independently of said bending devices adapted to fold the projecting corner flaps against the sides of the tray thus formed upon the block, clamping devices arranged to receive sheet metal blanks and to clamp them over the edges of the tray to secure the corner flaps in place.

40. In a tray forming mechanism, a forming block, means for bending a tray blank into contact with the sides of the block and for holding the tray clamped to the top of said block, folding devices for folding the corner flaps protruding between the bending devices against the sides of the tray, means below the forming block adapted to receive sheet metal binding blanks and clamp them to the edge of the tray, means for operating the binding and folding devices to bind and fold as aforesaid, means for withdrawing said binding and folding devices, means carried with the sheet metal clamping means adapted to contact with the corner flaps, and means for elevating said clamping means and said means to contact with the corner flaps, and for operating the clamping means to apply the sheet metal binding blank.

41. In a tray forming mechanism, a former, folding devices for folding a corner flap against the sides of a tray clamped to the forming block, a vertically movable carrier below one edge of the forming block, a wiper thereon adapted to wipe against a folded flap to guide this flap into the bent metal when the carrier is elevated, clamping jaws pivoted on the carrier, means for operating and withdrawing the folding devices, and means for raising the carrier and wiper and operating the clamping jaws.

42. In a tray forming mechanism, means for holding a tray blank having corner flaps folded against opposite sides thereof, means for retaining the folded flaps against said sides, clamps arranged in a position below the edge of the tray, each adapted to hold a V-shaped blank, means to lift the clamps to apply the V-shaped blanks to the edges of opposite sides of the tray, and means for closing the clamps to pinch the V-shaped blanks upon the tray and secure the folded flaps thereto.

43. In a tray forming mechanism, means for holding a folded tray blank having corner flaps folded against opposite sides thereof, means for retaining the folded flaps against said sides, clamping means adapted to receive V-shaped sheet metal blanks, means for producing a relative movement between said clamping means and said tray holding means so as to apply the V-shaped blanks over the edges of opposite sides of the tray, and means for closing the clamps to press the sheet metal blanks upon said edges of the tray and secure the folded flaps thereto.

44. In a tray forming mechanism, the combination of a forming block, means for holding the tray upon the forming block, clamping jaws for holding V-shaped tins located below the edges of the tray, supporting means to which the clamping jaws are pivoted, yielding devices tending to force the supporting means toward the forming block, unyielding devices connected to the jaws and adapted to open and close them, means to stop the approach of the supporting means toward the forming block, and means for operating the unyielding devices connected to the jaws whereby to permit the supporting means to approach the forming block and thereafter operate the jaws to close them and clamp the sheet metal blanks upon the edges of the tray.

45. In a tray forming mechanism, the combination of a forming block adapted to hold the tray, clamp supporting means located below the forming block and yieldingly pressed toward said block, stops projecting from said supporting means and adapted to contact with the under side of the block, clamping jaws pivoted on said supporting means and adapted to hold V-shaped sheet metal blanks, rods connected to the jaws and adapted to open and close them, and means for causing the rods to rise thereby permitting the supporting means to approach the forming block and thereafter closing the jaws to clamp the sheet metal blanks upon the edges of the tray.

46. In a tray forming mechanism, a forming block adapted to hold a tray, jaw supporting means located below the forming block, stop devices to limit the approach of the supporting means toward the block, a yoke, compression springs between the yoke and said jaw supporting means, clamping jaws pivoted on said supporting means, rods connecting said clamping jaws to said yoke, and means for reciprocating said yoke.

47. In a tray forming mechanism, the combination of a forming block adapted to hold a tray, clamp supporting means located below the forming block, stops adapted to limit the movement of said clamp supporting means toward the forming block, clamping jaws pivoted on said supporting means and adapted to hold V-shaped metal blanks, rods connected to the jaws adapted to open and close them, a cross head, connecting said rods, means for reciprocating the cross head, springs bearing between the cross head and said clamp supporting means, and means for receiving the jaw operating rods adjustable to the cross head to justify the tin clamping means.

48. In a tray forming mechanism, a removable forming block for supporting a tray, a support below said forming block, stops for limiting the approaching movement of said support toward said forming block, jaws pivoted on said support, rods for operating the jaws, a yoke rigidly connected to the rods, spring means bearing between the yoke and the support, means for reciprocating the yoke, and means whereby the amplitude of the reciprocations of the yoke may be adjusted.

49. In a tray forming mechanism, a forming block for supporting a tray, a support below said forming block, stops for limiting the approaching movement of said support toward said forming block, jaws pivoted on said support, a yoke below said support, compression springs between said yoke and said support, rods connecting the jaws to said yoke, a cam having an eccentric groove in its face, a cam fork connected to the cross head and having a stud engaging said eccentric groove, said eccentric groove having a portion that is wider than the diameter of said stud.

50. In a tray forming mechanism, a forming block for supporting a tray, a support below said forming block, stops for limiting the approaching movement of said support toward said forming block, jaws pivoted on said support, a yoke below said support, compression springs between said yoke and said support, rods connecting the jaws to said yoke, a cam having an eccentric groove in its face, a cam fork connected to the cross head and having a stud engaging said eccentric groove said eccentric groove having a portion that is wider than the said stud, and removable devices located at the entrance of the widened portion of the eccentric groove adapted to engage the stud and force it toward the inner wall of the eccentric groove.

51. In a tray forming mechanism, a forming block for supporting a tray, a support below said forming block, stops for limiting the approaching movement of said support toward said forming block, jaws pivoted on said support, a yoke below said support, compression springs between said yoke and said support, rods connecting the jaws to said yoke, a frame member below said yoke, adjustable stops between said frame member and yoke, means for reciprocating said yoke, and adjustable connections between said reciprocating means and said yoke.

52. Means for clamping sheet metal blanks to trays comprising a pair of pivoted jaws adapted to receive a V-shaped sheet metal blank, spurs on one of said jaws and cavities on the other jaw opposing the spurs.

53. Means for clamping a sheet metal blank upon the edge of a tray comprising a pair of pivoted jaws one of which has a flat surface provided with spurs and the other of which has rabbeted ends, cavities in the last mentioned jaw between the rabbeted ends and opposing the intermediate spurs of the other jaw.

54. In a tray forming mechanism, a forming block having a transverse groove on its under face and rabbets along its sides, a support below said block yieldingly urged in an upward direction, stops to limit the approach of said support toward said block, clamping jaws adapted to receive a V-shaped metal blank pivoted to said support, there being two pairs of said jaws arranged in parallel, a cross head arranged between said jaws and adapted to operate the inner jaw of each pair, means for operating the outer jaw of each pair, means for raising said cross head and operating means to permit the supporting means to approach the block and thereafter operate the jaws, said transverse groove in the block accommodating the cross head for operating the inner jaws in its upward limit of movement and the rabbets providing room for the closing of the sheet metal blanks upon the edges of the tray.

55. In a tray forming mechanism, a forming device, means beneath the forming device for clamping binding material to the edges of a tray, bending dies, means for feeding flat blanks to the bending dies, means for operating the dies to bend the blanks into V-shape, V-shaped guides adapted to direct the bent blanks into the clamping mechanism, and feeding devices having means to simultaneously feed a flat blank to the bending dies and to remove a bent blank from the bending dies and feed it to the clamping means.

56. The combination in a tray forming device, means adapted to clamp sheet metal binders to the edges of a tray on the forming device, means for reciprocating said clamping means from a position beneath the forming device to a position to clamp the blanks on the trays, a guide for sheet metal blanks adapted to direct blanks to the clamping mechanism, a portion of the guiding surface thereof being flat and a portion V-shaped in section, a matrix between the portion having the flat guiding surface and the V-shaped portion, said matrix being located beneath the level of the flat surface of the guide, dies for bending the blanks into the matrix, the V-grooves in said guides registering with the matrix for directing the bent blank into the grasp of the clamping means, and devices adapted to feed the flat blanks to the matrix and bending dies, and to feed the bent blanks into the clamping means.

57. The combination in a tray forming machine of means for affixing sheet metal bindings to the edges of a tray, a guide for flat blanks, a matrix depressed below the level of the guiding surface of said guide, a die adapted to press the flat blank into the matrix, a groove in said guide registering with said matrix and with said affixing means, a reciprocating feed finger having a shoulder on its upper edge adapted to engage a flat blank and move it to the matrix die, and an end portion adapted to reciprocate through the matrix and groove and advance a bent blank from the matrix to the affixing means.

58. In a tray forming mechanism, a tray forming device, means arranged beneath it for clamping binders to the edge of a formed tray, said means comprising vertically reciprocating clamping devices, a pair of stationary guides alined with the lower position of said clamping devices, said guides having flat blank receiving surfaces on a higher level than said clamping devices, a matrix between the ends of each guide, a means to feed and position flat blanks over the matrix, a vertically reciprocating die block, dies on the opposite parallel edges of the die block adapted to register with the matrices, and means for feeding the bent blanks from the die block through the guides and into the clamping devices.

59. In a tray forming mechanism, tray forming means, jaws adapted to be moved vertically below said means and to clasp a binding to the edge of a tray thereon, a carrier for said jaws, a guide in the carrier having a V-groove, alined with the space between the jaws when the jaws are open, a stationary guide having a V-groove in alinement with the groove in the carrier when it is in its lowest position, and means for feeding V-shaped sheet metal blanks through the stationary guide, through the guide on the carrier into the jaws.

60. In a tray forming mechanism, tray forming means, jaws adapted to be reciprocated below said means, and to clamp a binding to the edge of a tray thereon, a carrier for said jaws, a guide on the carrier having a V-groove alined with the space between the jaws when the jaws are open, a plate spaced from one side of the groove in said guide for keeping the V-blanks from escaping from the guide, a stationary guide having a V-groove in alinement with the groove in the guide in said carrier, and means for feeding V-shaped sheet metal blanks through said guides into the jaws.

61. In a tray forming mechanism, a forming device, jaws adapted to be moved vertically below said forming device and to clamp a binding to the edge of a tray thereon, a carrier for said jaws, a stationary guide having a groove in alinement with the opening between said jaws when the latter are in their lowest position, and an elastic stop device across the jaws on the side opposite the entrance to position the blanks in the jaws.

In testimony whereof I affix my signature.

ALOYSIUS J. KUSTERER.